US011438110B2

(12) United States Patent
Pfadler

(10) Patent No.: US 11,438,110 B2
(45) Date of Patent: Sep. 6, 2022

(54) WIRELESS COMMUNICATION DEVICE AND CORRESPONDING APPARATUS, METHOD AND COMPUTER PROGRAM

(71) Applicant: Volkswagen Aktiengesellschaft, Wolfsburg (DE)

(72) Inventor: Andreas Pfadler, Berlin (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/069,935

(22) Filed: Oct. 14, 2020

(65) Prior Publication Data

US 2021/0111844 A1   Apr. 15, 2021

(30) Foreign Application Priority Data

Oct. 14, 2019   (EP) .................................... 19202971

(51) Int. Cl.
*H04L 5/00*   (2006.01)
*H04B 1/69*   (2011.01)

(52) U.S. Cl.
CPC ............. *H04L 5/0023* (2013.01); *H04B 1/69* (2013.01)

(58) Field of Classification Search
CPC ............. H04L 27/2602; H04L 27/2639; H04L 5/0023; H04L 5/0048; H04B 1/692; H04B 7/0626
See application file for complete search history.

(56) References Cited

U.S. PATENT DOCUMENTS 9,444,514 B2   9/2016   Hadani et al.
10,090,973 B2   10/2018   Hadani et al.
(Continued)

FOREIGN PATENT DOCUMENTS

KR   2007-0122572 A   12/2007
WO       0158109 A1   8/2001
(Continued)

OTHER PUBLICATIONS

Peter Jung and Gerhard Wunder: "The WSSUS Pulse Design Problem in Multicarrier Transmission"; IEEE Transactions on Communications, vol. 55, No. 10, Oct. 2007, pp. 1918-1928.
(Continued)

*Primary Examiner* — Sam K Ahn
*Assistant Examiner* — Amneet Singh
(74) *Attorney, Agent, or Firm* — 2SPL Patentanwälte PartG mbB; Yong Beom Hwang

(57) ABSTRACT

Embodiments of the present disclosure relate to wireless communication devices, systems comprising wireless communication devices, and to an apparatus, a method and a computer program for a wireless communication device. The apparatus comprises a transceiver module for transmitting and receiving wireless transmissions. The apparatus comprises a processing module that is configured to control the transceiver module. The processing module is configured to communicate with a further wireless communication device via the transceiver module. The communication with the further wireless communication device is based on a transmission of data frames between the wireless communication device and the further wireless communication device. Each data frame is based on a two-dimensional grid in a time-frequency plane having a time dimension resolution and a frequency dimension resolution. The processing module is configured to select a communication mode from a plurality of communication modes for the communication between the wireless communication device and the wireless communication device. The communication mode defines a combination of a frequency dimension resolution and a time dimension resolution of the two-dimensional grid in the time-frequency plane. The processing module is configured to negotiate a communication mode of the plurality of communication modes to select for a future communication
(Continued)

between the wireless communication device and the further wireless communication device with the further wireless communication device.

12 Claims, 7 Drawing Sheets

(56) References Cited

U.S. PATENT DOCUMENTS

| | | | |
|---|---|---|---|
| 2004/0184398 A1* | 9/2004 | Walton | H04L 1/0016 370/332 |
| 2015/0117395 A1 | 4/2015 | Hadani et al. | |
| 2016/0119937 A1 | 4/2016 | Kim et al. | |
| 2017/0012749 A1 | 1/2017 | Rakib et al. | |
| 2017/0078054 A1 | 3/2017 | Hadani et al. | |
| 2017/0141885 A1* | 5/2017 | Bontu | H04W 72/042 |
| 2017/0280444 A1* | 9/2017 | Da Silva | H04L 5/0048 |
| 2018/0205481 A1 | 1/2018 | Shlomo et al. | |
| 2019/0159042 A1* | 5/2019 | Tomeba | H04W 72/046 |
| 2020/0389268 A1* | 12/2020 | Sathyanarayan | H01Q 1/246 |

FOREIGN PATENT DOCUMENTS

| | | |
|---|---|---|
| WO | 2013134956 A1 | 9/2013 |
| WO | 2016014598 A1 | 1/2016 |
| WO | 2016183240 A1 | 11/2016 |
| WO | 2017147439 A1 | 8/2017 |
| WO | 2017165697 A1 | 9/2017 |
| WO | 2018032016 A1 | 2/2018 |
| WO | 2019113046 A1 | 6/2019 |

OTHER PUBLICATIONS

Tiejun Wang et al.: "Performance Degradation of OFDM Systems Due to Doppler Spreading"; IEEE Transactions on wireless communications, vol. 5, No. 6, Jun. 2006, pp. 1422-1432.
R. Hadani et al.: "Orthogonal Time Frequency Space Modulation"; in 2017 IEEE Wireless Communications and Networking Conference (WCNC), pp. 1-6, IEEE, 2017.
R. Hadani et al.: "Orthogonal time frequency space (otfs) modulation for millimeter-wave communications systems," in 2017 IEEE MTT-S International Microwave Symposium (IMS), pp. 681-683, Jun. 2017.
Fred Wiffen et al.: "Comparison of otfs and ofdm in ray launched sub-6 ghz and mmwave line-of-sight mobility channels," in 2018 IEEE 29th Annual International Symposium on Personal, Indoorand Mobile Radio Communications (PIMRC), pp. 73-79, IEEE, 2018.
M.K. Ramachandran et al.: "Mimo-otfs in high-doppler fading channels: signal detection and channel estimation," arXiv preprint arXiv:1805.02209, 2018.
Ahmad Nimr et al.: "Extended gfdm framework: Otfs and gfdm comparison," in 2018 IEEE Global Communications Conference (GLOBECOM), pp. 1-6, Dec. 2018.
Ke Liu et al.: "Orthogonal time-frequency signaling over doubly dispersive channels," IEEE Transactions on Information Theory, vol. 50, No. 11, pp. 2583-2603, 2004.
Werner Kozek et al.: "Nonorthogonal pulseshapes for multicarrier communications in doubly dispersive channels," IEEE Journal on Selected Areas in Communications, vol. 16, pp. 1579-1589, Oct. 1998.
Zdenek Prusa et al.: "The Large Time-Frequency Analysis Toolbox 2.0," in Sound, Music, and Motion, LNCS, pp. 419-442, Springer International Publishing, 2014.
Stephan Jaeckel et al.: "Quadriga: A 3-d multi-cell channel model with time evolution for enabling virtual field trials," IEEE Transactions on Antennas and Propagation, vol. 62, No. 6, pp. 3242-3256, 2014.
Philip A. Bello: "Characterization of randomly time-variant linear channels," IEEE Transactions on Communications Systems, vol. 11, No. 4, pp. 360-393, 1963.
P. Raviteja et al.: "Embedded pilot-aided channel estimation for otfs in delay-doppler channels," IEEE Transactions on Vehicular Technology, pp. 4906-4917, 2019.
Xiaoli Ma and Wei Zhang: "Fundamental limits of linear equalizers: diversity, capacity, and complexity," IEEE Transactions on Information Theory, vol. 54, No. 8, pp. 3442-3456, 2008.
Thomas Zemen et al.: "Low-complexity equalization for orthogonal time and frequency signaling (otfs)," arXiv preprint arXiv:1710. 09916, 2017.
R. Hadani et al.: "A New Generation of Modulation Addressing the Challenges of 5G", pp. 1-37; 2018.
Wenquian Shen et al.: "Channel Estimation for Orthogonal Time Frequency Space (OTFS) Massive MIMO." arXiv preprint arXiv:1903. 09441 (2019).
Rose Mary Augustine et al.: "Interleaved time-frequency multiple access using OTFS modulation."; 2019.
Zhiguo Ding et al.: "OTFS-NOMA: An Efficient Approach for Exploiting Heterogenous User Mobility Profiles." arXiv preprint arXiv:1904.02783 (2019).
Cohere Technologies et al.: "OTFS Modulation Waveform and Reference Signals for New RAT", 3GPP TSG RA WG1 Meeting #84-bis R1-162930, Busan, South Korea, Apr. 11-15, 2016.
Stoica et al.: "Sparse Estimation of Spectral Lines: Grid Selection Problems and Their Solutions", IEEE Transactions on Signal Processing, vol. 60, No. 2, Feb. 2012, pp. 962-967.
Ericsson: "On Inter-RAT Network Control of Sidelink", 3GPP Draft; R2-1815038—On Inter-RAT Network Control of Sidelink, 3rd Generation Partnership Project (3GPP), Mobile Competence Centre; 650, Route Des Lucioles; F-06921 Sophia-Antipolis Cedex; FRAN; vol. RAN WG2, No. Chengdu, China; Oct. 8, 2018-Oct. 12, 2018 Sep. 27, 2018 (Sep. 27, 2018), XP051524406.

\* cited by examiner

| Mode | N | M | Pulse | 310 V2I (10 km/h) | 320 V2I (190 km/h) | 330 V2V (200 km/h) |
|---|---|---|---|---|---|---|
| I | 64 | 64 | Rect. | 11.8 dB | 9.2 dB | 8.1 dB |
| | | | Gauss | 11 dB | 8.8 dB | 7.7 dB |
| II | 256 | 16 | Rect. | - | 9.6 dB | 8 dB |
| | | | Gauss | - | 9 dB | 7.7 dB |
| III | 16 | 256 | Rect. | 11.1 dB | 9.9 dB | 8.6 dB |
| | | | Gauss | 10.6 dB | 9.3 dB | 8 dB |
| IV | 1024 | 4 | Rect. | - | - | 9.4 dB |
| | | | Gauss | - | - | 8.8 dB |
| V | 4 | 1024 | Rect. | 11.6 dB | - | 20.6 |
| | | | Gauss | 11.2 dB | - | 14.1 dB |

FIG. 3a

| Mode | N | M | Pulse | 310 V2I (10 km/h) | 320 V2I (190 km/h) | 330 V2V (200 km/h) |
|---|---|---|---|---|---|---|
| I | 64 | 64 | Rect. | - | - | 14.4 dB |
| | | | Gauss | - | - | 13.8 dB |
| II | 256 | 16 | Rect. | - | - | 13.8 dB |
| | | | Gauss | - | - | 12.9 dB |
| III | 16 | 256 | Rect. | 21.3 dB | - | - |
| | | | Gauss | 20.3 dB | - | 13.5 dB |
| IV | 1024 | 4 | Rect. | - | - | - |
| | | | Gauss | - | - | - |
| V | 4 | 1024 | Rect. | 18.5 dB | - | - |
| | | | Gauss | 18.1 dB | - | - |

FIG. 3b

| Parameter | Notation | Values | Unit |
|---|---|---|---|
| Carrier frequency | $f_c$ | 5.9 | GHz |
| Bandwidth | B | 5 | MHz |
| Modulation scheme | QPSK | - | - |
| Time-frequency product | TF | 1.25 | - |
| Filter length | L | 5120 | - |
| Number of OTFS symbols | MN | 4096 | - |
| Number of data symbols | - | 3648 | - |
| Pilot + guard symbols | QW | 448 | - |

FIG. 3c

WIRELESS COMMUNICATION DEVICE AND CORRESPONDING APPARATUS, METHOD AND COMPUTER PROGRAM

Embodiments of the present disclosure relate to wireless communication devices, systems comprising wireless communication devices, and to an apparatus, a method and a computer program for a wireless communication device.

New requirements in terms of reliability and efficiency in high mobility environments, such as vehicle-to-vehicle (V2V) communication, are pushing legacy systems to their limits. Orthogonal frequency-division multiplexing (OFDM) is a popular and well-known modulation scheme but it may suffer from substantial performance degradation and inflexibility in environments with high Doppler spreads. Consequently, novel modulation schemes may be considered and perused which are flexible, efficient and robust in doubly-dispersive channels.

Orthogonal time frequency and space (OTFS) was introduced by Hadani et. al as a promising recent combination of classical pulse-shaped Weyl-Heisenberg (or Gabor) multi-carrier schemes with a distinct time-frequency (TF) spreading. Data symbols are spread with the symplectic finite Fourier transform (SFFT) over the whole time-frequency grid. This particular linear pre-coding accounts for the doubly-dispersive nature of time-varying multipath channels seen as linear combinations of time-frequency shifts. Several studies show that OTFS outperforms OFDM in such situations. Other research focus on a performance comparison of OFDM, generalized frequency division multiplexing (GFDM), and OTFS. It reveals significant advantages of OTFS in terms of bit error rate (BER) and frame error rate (FER) in relation to the others. With sufficient accurate channel information it offers a promising increase in terms of reliability and robustness for high mobility users when using sophisticated equalizers. So far, OTFS was researched with the assumption of perfect grid-matching, often with idealized pulses violating the uncertainty principle and in many cases with ideal channel knowledge (including the cross-talk channel coefficients).

There may be a desire for providing an improved concept for the use of OTFS or OTFS-like modulation in real-world scenarios.

This desire is addressed by the subject-matter of the independent claims.

Embodiments are based on the finding that, in the discussion of OTFS in literature, perfect grid matching was assumed. To fully exploit diversity in OTFS, the 2D-deconvolution implemented by a linear equalizer should approximately invert the doubly-dispersive channel operation, which however is a twisted convolution. In theory this is achieved by choosing the time-frequency grid and the Gabor synthesis and analysis pulses based on the delay and Doppler spread of the channel. However, in practice a balance may be struck between supporting high granularity in delay-Doppler spread and multi-user and network aspects.

In particular, at the receiver, computationally feasible equalizers (such as minimum mean square equalizers) suffer from the mismatched time-frequency grids. This may be avoided if the grid that is used for communicating is matched to the Gabor synthesis and analysis pulses based on the delay and Doppler spread of the channel. In order to keep the complexity low, the grid may be chosen from a predefined set of "mobility modes", which may define the dimensions of the grid, and optionally, the shape of the pulses used. In embodiments, the dimensions of the grid may be negotiated between the wireless communication devices communicating with each other.

Embodiments of the present disclosure provide an apparatus for a wireless communication device. The apparatus comprises a transceiver module for transmitting and receiving wireless transmissions. The apparatus comprises a processing module that is configured to control the transceiver module. The processing module is configured to communicate with a further wireless communication device via the transceiver module. The communication with the further wireless communication device is based on a transmission of data frames between the wireless communication device and the further wireless communication device. Each data frame is based on a two-dimensional grid in a time-frequency plane having a time dimension resolution and a frequency dimension resolution. The processing module is configured to select a communication mode from a plurality of communication modes for the communication between the wireless communication device and the wireless communication device. The communication mode defines a combination of a frequency dimension resolution and a time dimension resolution of the two-dimensional grid in the time-frequency plane. The processing module is configured to negotiate a communication mode of the plurality of communication modes to select for a future communication between the wireless communication device and the further wireless communication device with the further wireless communication device. By selecting one of a plurality of communication modes, a communication mode can be chosen for the communication between the wireless communication device and the wireless communication device that suits the channel and/or the relative velocity of the wireless communication devices.

Negotiating the communication mode to select for the future communication may enable the wireless communication device to change the communication mode for the communication at the same time, and to select a communication that is suitable for both wireless communication devices (e.g. in case a delay spread and/or a Doppler spread of the channel is asymmetrical). For example, a communication mode having a higher resolution in the frequency dimension may be suitable for channels with a larger delay spread (e.g. if the wireless communication devices have a lower velocity relative to each other), and a communication mode having a higher resolution in the time dimension may be suitable for channels with a larger Doppler spread (e.g. if the wireless communication devices have a higher velocity relative to each other).

For example, the processing module may be configured to initially select a communication mode that is known at the wireless communication device and at the further wireless communication device for the communication between the wireless communication device and the further wireless communication device. For example, the communication mode that is known at both wireless communication devices may be used to establish the communication between the wireless communication devices. Based on the initially selected communication mode, and the correspondingly established communication, the negotiation may be performed.

For example, the processing module may be configured to initially select a default communication mode for the communication between the wireless communication device and the further wireless communication device. The default communication mode may be a "robust" communication mode that can be used in a variety of scenarios.

Alternatively, the processing module may be configured to initially select a communication mode that was selected for a previous communication between the wireless communication device and the further wireless communication device for the communication between the wireless communication device and the further wireless communication device. The previously selected communication mode is known at both wireless communication devices, and may be suitable for the channel that is used for the communication between the wireless communication devices (e.g. if the communication is sparse and the communication is re-established after an extended pause).

In some embodiments, the processing module may be configured to transmit information about a communication mode to select for a future communication between the wireless communication device and the further wireless communication device to the further wireless communication device. The processing module may be configured to select the communication mode for the future communication with the further wireless communication device. This may indicate to the further wireless communication device which of the plurality of communication modes the wireless communication device intends to use for the future communication. After transmitting the information on the communication mode to select for the future communication, both wireless communication device may switch to said communication mode, which may be more suitable for the channel between the wireless communication devices.

For example, each data frame may comprise a pilot symbol. The processing module may be configured to determine a spreading function of a channel that is used for the communication based on the pilot symbol of a previously received data frame. The processing module may be configured to select the communication mode for the future communication based on the spreading function of the channel. Based on the spreading function, an appropriate communication mode may be selected. For example, a communication mode having a higher resolution in the frequency dimension may be appropriate for channels with a larger delay spread (e.g. if the wireless communication devices have a lower velocity relative to each other), and a communication mode having a higher resolution in the time dimension may be appropriate for channels with a larger Doppler spread (e.g. if the wireless communication devices have a higher velocity relative to each other).

Alternatively or additionally, the processing module may be configured to receive information about a communication mode to select for a future communication between the wireless communication device and the further wireless communication device from the further wireless communication device. The processing module may be configured to select the communication mode for the future communication with the further wireless communication device. In this case, the further wireless communication device may propose the communication mode to use for the future communication, e.g. as an initial proposal, or in response to a previous proposal of the wireless communication device. After receiving the information on the communication mode to select for the future communication, both wireless communication device may switch to said communication mode, which may be more suitable for the channel between the wireless communication devices, or an alternative communication mode may be proposed by the wireless communication device.

In at least some embodiments, the processing module may be configured to examine the information about the communication mode to select for future communication based on an examination criterion. The processing module may be configured to select the communication mode for the future communication with the further wireless communication device if the communication mode to use for future communication if the examination criterion is fulfilled. The processing module may be configured to transmit a response to the further wireless communication device (e.g. via the transceiver module) if the examination criterion is not fulfilled. The response may comprise information about an alternative communication mode to select for the future communication. For example, the communication mode proposed by the further wireless communication device may be deemed unsuitable by the wireless communication device (e.g. as it perceives a different channel). In this case, the wireless communication device may provide an alternative proposal.

For example, each data frame may comprise a pilot symbol. The processing module may be configured to determine a spreading function of a channel that is used for the communication based on the pilot symbol of a previously received data frame. The processing module may be configured to select the alternative communication mode for the future communication based on the spreading function of the channel. Based on the spreading function, an appropriate alternative communication mode may be selected. For example, a communication mode having a higher resolution in the frequency dimension may be appropriate for channels with a larger delay spread (e.g. if the wireless communication devices have a lower velocity relative to each other), and a communication mode having a higher resolution in the time dimension may be appropriate for channels with a larger Doppler spread (e.g. if the wireless communication devices have a higher velocity relative to each other).

The spreading function may also be used to evaluate the proposal by the further wireless communication device. For example, each data frame may comprise a pilot symbol. The processing module may be configured to determine a spreading function of a channel that is used for the communication based on the pilot symbol of a previously received data frame. The examination criterion may be based on the spreading function of the channel. Based on the spreading function, the suitability of the communication mode may be examined. For example, a communication mode having a higher resolution in the frequency dimension may be suitable for channels with a larger delay spread, and a communication mode having a higher resolution in the time dimension may be suitable for channels with a larger Doppler spread.

In various embodiments, the communication between the wireless communication device and the further wireless communication device comprises a plurality of data frames that are transmitted between the wireless communication device and the further wireless communication device. The processing module may be configured to change the communication mode during the communication between the wireless communication device and the further wireless communication device. This may enable an adjustment of the communication mode to be performed if properties of a channel being used for the communication change.

In at least some embodiments, the two-dimensional time-frequency grid may be derived from a two-dimensional grid in a delay-Doppler plane having a delay dimension and a Doppler dimension. By modulating the values to be transmitted in the delay-Doppler plane, the modulated values are spread over the time-frequency plane, which makes them less susceptible to narrowband interference. In some embodiments, the data frame is an Orthogonal Time-Frequency Spreading data frame.

Embodiments further provide a wireless communication device comprising the apparatus.

Embodiments further provide a system comprising a wireless communication device and a further wireless communication device. The wireless communication device and the further wireless communication device each comprise the apparatus. The wireless communication device and the further wireless communication device are configured to communicate with each other.

Embodiments of the present disclosure further provide a method for a wireless communication device. The method comprises communicating with a further wireless communication device. The communication with the further wireless communication device is based on a transmission of data frames between the wireless communication device and the further wireless communication device. Each data frame is based on a two-dimensional grid in a time-frequency plane having a time dimension resolution and a frequency dimension resolution. The method comprises selecting a communication mode from a plurality of communication modes for the communication between the wireless communication device and the wireless communication device. The communication mode defines a combination of a frequency dimension resolution and a time dimension resolution of the two-dimensional grid in the time-frequency plane. The method comprises negotiating a communication mode of the plurality of communication modes to select for a future communication between the wireless communication device and the further wireless communication device with the further wireless communication device Embodiments of the present disclosure provide a computer program having a program code for performing the method, when the computer program is executed on a computer, a processor, or a programmable hardware component.

Some examples of apparatuses and/or methods will be described in the following by way of example only, and with reference to the accompanying figures, in which FIG. 1 shows an exemplary OTFS frame;

FIGS. 3a and 3b depict Signal-to-Noise-Ratio required to attain a desired bit-error rate in an evaluation of an embodiment;

Figure 1:
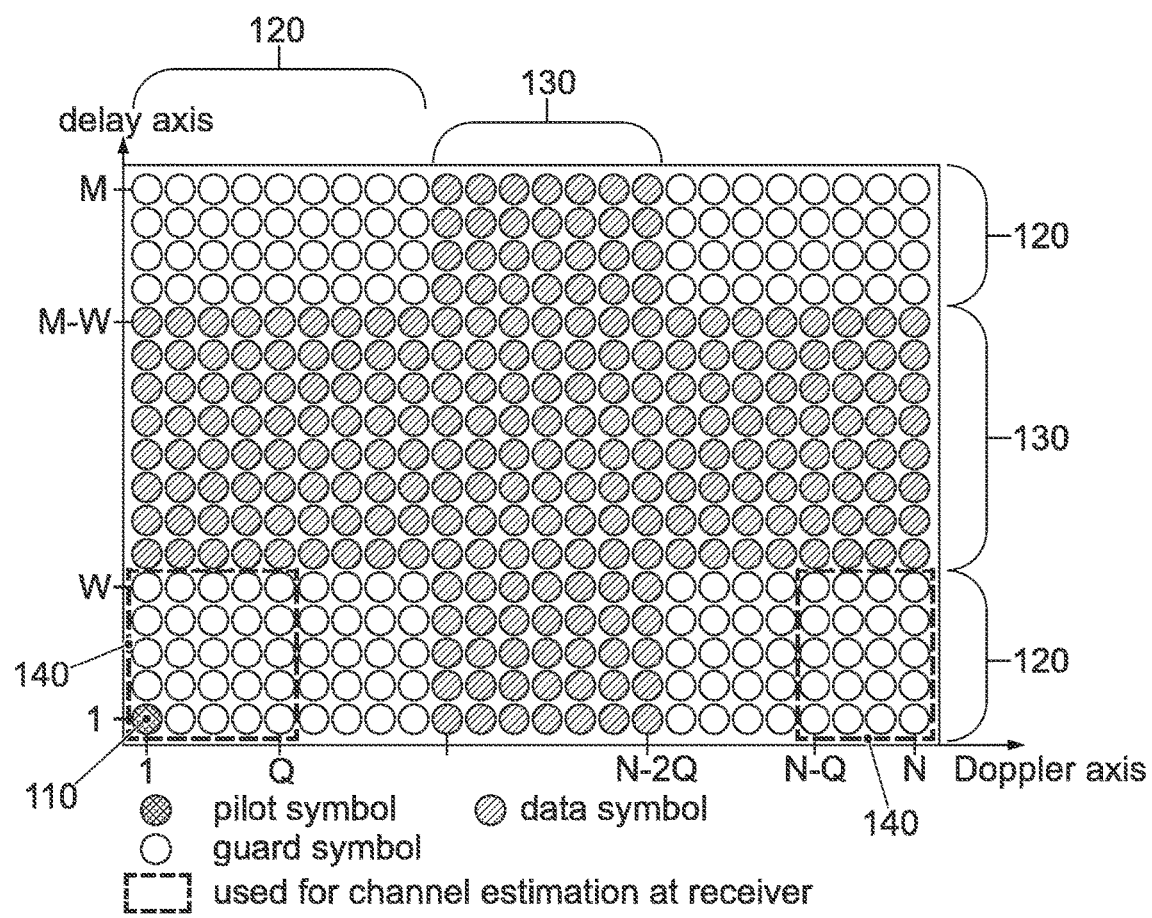

FIG. 3c summarizes parameters used to obtain the numerical results of FIGS. 3a and 3b; and FIGS. 4a to 4d show bit-error rate curves for three distinct vehicular channels for different mobility modes.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Embodiments of the present disclosure relate to a use of so-called mobility modes with distinct grid and pulse matching for different doubly dispersive communication links. In other words, embodiments may relate to mobility modes for multicarrier filter banks, and may provide a grid matching approach. To account for remaining self-interference without the need of estimating channel cross talk coefficients when selecting a particular mobility mode, in at least some embodiments, the minimum mean square error (MMSE) one-tap equalizer may be tuned to account for the self-interference power as well. The approach has been evaluated for a radio channel generated by the geometry-based statistic Quadriga channel model and with an OTFS transceiver architecture based on a polyphase implementation for orthogonalized Gaussian and rectangular pulses. Results indicate that, with the appropriate mobility mode, the potential OTFS gains can be indeed obtained with such tuned equalizers.

Different doubly-dispersive communication channels provide distinct delay-Doppler spread and diversity characteristics. Particular single-dispersive cases therein are time- or frequency-invariant channels, which yield to simple frequency or time division communication schemes, respectively. However, for several high mobility environments, the channel becomes dispersive in both time and frequency domain. Especially, vehicular channels may differ in their dissipation in both domains time and frequency. Depending on the communication link a distinct spreading region is spanned:

$$U := \left[0, \frac{\tau}{B}\right] \times \left[-\frac{vB}{L}, \frac{vB}{L}\right]$$

where B, L, ν, and τ are the bandwidth, length of the filter, Doppler, and delay spread, respectively. In order to cope with doubly-dispersive channels the synthesis pulse used at the transmitter, the analysis pulse used at the receiver, and their time-frequency grid may match U. A common way is therefore to revise the grid, time and frequency spreads $\sigma_t$ and $\sigma_f$, respectively, of the Gabor pulses with respect to the channel scattering function of the doubly-dispersive channel $$\frac{T}{F} = \frac{\sigma_t}{\sigma_f} =^! \frac{\tau_{max}}{2\upsilon_{max}} \qquad (1)$$

where $$\frac{\tau_{max}}{2\upsilon_{max}}$$

is the ratio between the maxima of the delay and the Doppler dispersion of the channel. This approach is referred as pulse and grid matching. In order to approach the condition (1) of perfect pulse and grid matching, the present disclosure proposes and investigates distinct mobility modes.

There are further aspects in pulse design, depending on the scenario. In some approaches, bi-orthogonality, sometimes called as biorthogonal frequency division multiplexing (BFDM), may be enforced, which may enable interference-free communication in additive white Gaussian noise (AWGN) channels. Choosing then, as in some embodiments of the present disclosure, synthesis and analysis pulses to be equal in order to maximize the signal to noise ratio (SNR) for an AWGN channel, yields an orthogonal signaling having even uncorrelated noise contributions.

The present disclosure may provide investigation of OTFS from the classical angle of pulse-shaped Gabor signaling with additional TF spreading, implemented using Z. Pruša et al.: "The Large Time-Frequency Analysis Toolbox 2.0,". The present disclosure may further provide a consideration of doubly-dispersive vehicular channels in a concrete geometry-based scenario generated by the Quadriga channel (S. Jaeckel et al.: "Quadriga: A 3-d multi-cell channel model with time evolution for enabling virtual field trials)" using pilot-based channel estimation as in U.S. Pat. No. 9,444,514.

Embodiments may provide mobility modes with distinct pulse and grid matching. Furthermore, at least some embodiments may account for the impact of the remaining self-interference in the equalizer due to imperfect 2D-deconvolution of the twisted convolution affected by grid and pulse mismatch.

In the following, the OTFS Gabor system model and the OTFS transceiver structure is introduced. As already mentioned above, OTFS is combination of pulse shaped multicarrier transmission (with Weyl-Heisenberg/Gabor structure, i.e., time-frequency translations on a regular grid in the time-frequency plane) and additional TF spreading using the SFFT.

In the following, the time-frequency grid and pulse shaping, as used in at least some embodiments, is introduced. The frequency resolution may be defined as F=B/M, where B is the overall bandwidth and M the number of sub-carriers. The time resolution may be defined as T=D/N, with D the frame duration and N the number of symbols. The time frequency grid may be sampled with T and F period in the time and frequency axis, respectively, and may be generated by $\Lambda$=diag(T,F) as follows:

$$G=\{(mF,nT),n,m \in Z\} \qquad (2)$$

The entire duration of the transmit Gabor signal may be N·T seconds with a used bandwidth of M·F Hertz. Note that the total duration may depend also on the dimensioning of the used synthesis and analysis pulse and the so called time frequency product TF. Gabor (polyphase) filter banks at the transmitter and at the receiver may be configured with pulses γ for the synthesis and g for the analysis of the signals, respectively. The dimensioning of these pulses with respect to the TF grid may be termed as time-frequency localization. For the TF product, three cases may be distinguished, where the product, TF>1, TF=1, and TF<1—sometimes denoted as undersampling, critical sampling, and oversampling of the time-frequency plane, respectively. In at least some aspects of the present disclosure, the TF product was chosen as TF=1.25. To enable perfect reconstruction in the nondispersive and noiseless case, the pulses γ and g may be biorthogonal, meaning that:

$$<\gamma,g(t-nT)e^{j2\pi mFt}>=\delta(m)\delta(n) \qquad (3)$$

where $\delta(0)=1$ and zero else. Here, $<u, v>=\int \overline{u}(t)v(t)dt$ may be used as inner product on $L_2(R)$, the Hilbert space of signals with finite energy. To achieve also uncorrelated noise contributions, the synthesis and analysis pulse may be chosen to be equal, resulting in an orthogonal pulse (orthogonal to its time-frequency translates on the time-frequency translates). Given a preliminary prototype pulse, the well-known $S^{-1/2}$-trick may be used to perform the orthogonalization (constructing a tight Gabor frame on the adjoint lattice, see e.g. P. Jung and G. Wunder, "WSSUS pulse design problem in multicarrier transmission"). However, exact orthogonality at the output of doubly-dispersive channels may be destroyed, resulting in self-interference. By choosing different pulses for the transmitter and receiver, it may be possible to further reduce the expected power of self-interference for classes of doubly-dispersive channels (e.g. characterized by the scattering function in a wide-sense stationary scattering (WSSUS) model).

OTFS may be based on TF-Spreading and De-Spreading. So far, the transceiver structure is essentially the same as any pulse shaped multicarrier scheme, like pulse-shaped OFDM, BFDM or filter bank multicarrier (FBMC). A distinct feature of OTFS is the spreading. All symbols $X=\{X_{lk}\}_{l,k \in I}$ where $I \subseteq [M] \times [N]$ may be pre-coded with the so called SFFT (sometimes also denoted Zak transform) which is further denoted by the linear operator $F_s$. The symplectic Fourier transform contrast from the ordinary 2D Fourier transformation by its sign switching in the exponent and coordinate swapping. This may be interpreted by mapping an array on discrete delay-Doppler positions (l, k) to an array on grid points (m, n) in the time-frequency plane, since time shifts leads to oscillation in frequency and frequency shift cause them in time. More precisely, at the transmitter the pre-coding may be done by $x=F_s^{-1}X$ with $x=\{x_{mn}\}_{m,n \in I}$ which is:

$$x_{mn} = \sum_{(l,k) \in I} X_{lk} e^{j2\pi\left(\frac{nk}{N} - \frac{ml}{M}\right)} \qquad (4)$$

where $x_{mn}$ is the value transmitted by the transmitter at grid point (m, n) of the time-frequency grid, and $X_{lk}$ is the value at grid point (l, k) of the delay-doppler grid, where I is the set of grid points on the time-frequency grid and on the delay-doppler grid (which may have the same dimensions). Since channel estimation and equalization is discussed in more detail below, it is only briefly mentioned here that after equalization the symbols $\hat{y}=\{\hat{y}_{mn}\}_{m,n\in I}$ in the time-frequency plane are de-spreaded again as $\hat{Y}=F_s\hat{y}$ with the SFFT:

$$\hat{Y}_{lk} = \sum_{(m,n)\in I} \hat{y}_{mn} e^{-j2\pi\left(\frac{nk}{N}-\frac{ml}{M}\right)} \qquad (5)$$

where $\hat{y}_{mn}$ is the value received at grid point (m, n) of the time-frequency grid, and $\hat{Y}_{lk}$ is the value at grid point (l, k) of the delay-doppler grid after the SFFT (after de-spreading).

In the following, an exemplary structure of OTFS frames is shown. In some embodiments, a pilot based channel estimation is used, where a pilot is inserted in the delay-Doppler (DD) domain as used in U.S. Pat. No. 9,444,514. The pilot may be sent by the transmitter simultaneously with data in the same frame, and due to its design, the channel can be easily detected at the receiver in the DD domain. FIG. 1 shows an exemplary OTFS frame with pilot 110, guard 120, and data symbols 130 in the DD domain. The symbols inside the dashed frames 140 may be used for the channel estimation at the receiver. In detail, the symbols to be placed in the DD domain may be three fold, i.e. data symbols 130 (usually coming from a particular modulation alphabet) are placed on positions indexed by the set $D \subset I$ (D being the set of data symbols), positions used for channel estimation are defined by the set $P \subset I$ (P being the set comprising pilot 110 and guard symbols 120) with $D \cap P = \emptyset$ (symbols are either used as data symbols or a pilot/guard symbols), which may contain a single pilot symbol and the other positions are unused (can be seen as guard symbols). Hence, it may be set:

$$P=\{(l,k):l\in[2W],k\in[4Q]\}\subset I \qquad (6)$$

and an arbitrary location $[l=\tau, k=2v]$ may be used for the non-zero pilot symbol. Note that W and Q may be defined with respect to the expected delay and Doppler shift, respectively. In the following, Q and W were chosen without pretending to reduce the number of guard symbols to an appropriate dimension for each OTFS mode but a constant product of Q·W, i.e. 448 symbols. However, other configurations are feasible.

The non-zero pilot $X_{lk}=\sqrt{P_p}$ may be set at k=1 and l=1 (as shown in FIG. 1) with the normalized power of $P_p=2Q4W$ and all the other symbols may be P are zero-valued guard symbols such that $$x_{mn}^P = \sum_{(l,k)\in P} X_{lk} e^{j2\pi\left(\frac{nk}{N}-\frac{ml}{M}\right)} = \sqrt{P_p}\, e^{j2\pi\left(\frac{n}{N}-\frac{m}{M}\right)}$$

Thus, summarizing, the OTFS frame in the TF domain may be given by the superposition of the pilot and data symbols:

$$x_{mn} = \sum_{(l,k)\in D} X_{lk} e^{j2\pi\left(\frac{nk}{N}-\frac{ml}{M}\right)} + \sum_{(l,k)\in P} X_{lk} e^{j2\pi\left(\frac{nk}{N}-\frac{ml}{M}\right)} = \qquad (8)$$

$$x_{mn}^D + x_{mn}^P = x_{mn}^D + \sqrt{P_p}\, e^{j2\pi\left(\frac{n}{N}-\frac{m}{M}\right)}$$

The OTFS frame in the time-frequency plane may then be used to synthesize a transmit signal s(t). This may, for example, be implemented with a Gabor synthesis filter bank configured with a transmit pulse γ. This can be formally written as:

$$s(t) = \sum_{(m,n)\in I} \gamma(t-nT) e^{j2\pi mFt} x_{mn} \qquad (9)$$

For a doubly-dispersive channel the noiseless time-continuous channel output may consist of (or be based on) an unknown linear combination of time-frequency translates of the input signal s(t). One way of writing this formally is to express this operation in terms of a time-varying convolution:

$$r(t) = \sum_{p=1}^{p_{max}} h_p(t)s(t-\tau_p) = \sum_{(m,n)\in I} x_{mn} \sum_{p=1}^{p_{max}} h_p(t)\gamma(t-\tau_p-nT) e^{j2\pi mF\cdot(t-\tau_p)} \qquad (10)$$

where r(t) is the received signal, and where the pth discrete propagation path has delay $\tau_p$ for $p=1 \ldots p_{max}$. The index set A may be defined as $A:=[1 \ldots d_{max}]\times[1 \ldots p_{max}]$. The time-varying behaviour of $h_p(t)$ (the propagation-path and time-dependent channel) may be given by:

$$h_p(t)=\Sigma_{d=1}^{d_{max}} S_{dp} e^{j2\pi\cdot t\cdot v_d} \qquad (11)$$

where $\{S_{dp}\}_{(d,p)\in A}$ can be understood as the discrete delay-Doppler (DD) spreading function (see for example P. Bello, "Characterization of randomly time-variant linear channels"). In particular, this simplified model implies that each path has the same range of frequency shifts $\{v_d\}_{d=1}^{d_{max}}$ but with possibly different coefficients. In many cases, it may be assumed that the set of time-frequency shifts $\{(v_d, \tau_p)\}_{(d,p)\in A} \subset U$ are usually in a box $U:=[-v_{max}, v_{max}]\times[0, \tau_{max}]$ of size $|U|=2v_{max}\tau_{max}\ll 1$, which is also known as the underspread assumption. Putting things together yields therefore:

$$r(t) = \sum_{(m,n)\in I} x_{mn} \sum_{(d,p)\in A} S_{dp}\gamma(t-\tau_p-nT) \times e^{j2\pi mF\cdot(t-\tau_p)} \cdot e^{j2\pi\cdot t\cdot v_d} \qquad (12)$$

The received signal may be down-converted and passed into analysis filter bank (e.g. a Gabor analysis filter bank). The output of the Gabor analysis filter bank (for exposition, the noiseless case is discussed here) time-frequency slot $(\bar{m}, \bar{n})\in I$ is then:

$$y_{\bar{m}\bar{n}} = \langle g(t-\bar{n}T)\cdot e^{j2\pi\bar{m}Ft}, r(t)\rangle = \sum_{(m,n)\in I} x_{mn} \qquad (13)$$

$$\sum_{(d,p)\in A} S_{dp} e^{-j2\pi\cdot mF\cdot\tau_p} \times \langle g(t-\bar{n}T)\cdot e^{j2\pi\bar{m}Ft}, \gamma(t-\tau_p-nT) e^{j2\pi(mF+v_d)t}\rangle$$

where $y_{\bar{m}\bar{n}}$ is the value received at grid point (m, n) of the time-frequency grid (before equalization).

At least some embodiments may be based on the framework and equations laid out above. In particular, at least some embodiments may relate to OTFS-based communication between a wireless communication device and a further wireless communication device. This communication may be based on one of a plurality of communication modes (also denoted "mobility modes"), that define the dimension of the grids in the time-frequency plane and in the delay-Doppler plane.

Figure 2A:
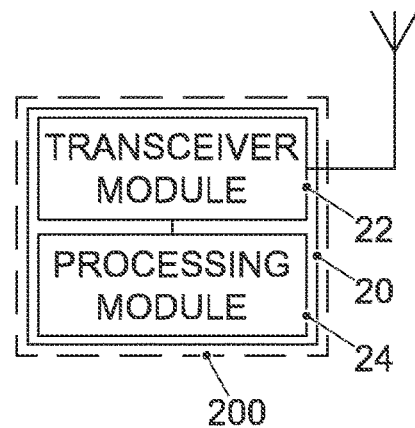
FIG. 2a shows a block diagram of an embodiment of an apparatus for a wireless communication device and of a wireless communication device.
Figure 2B:
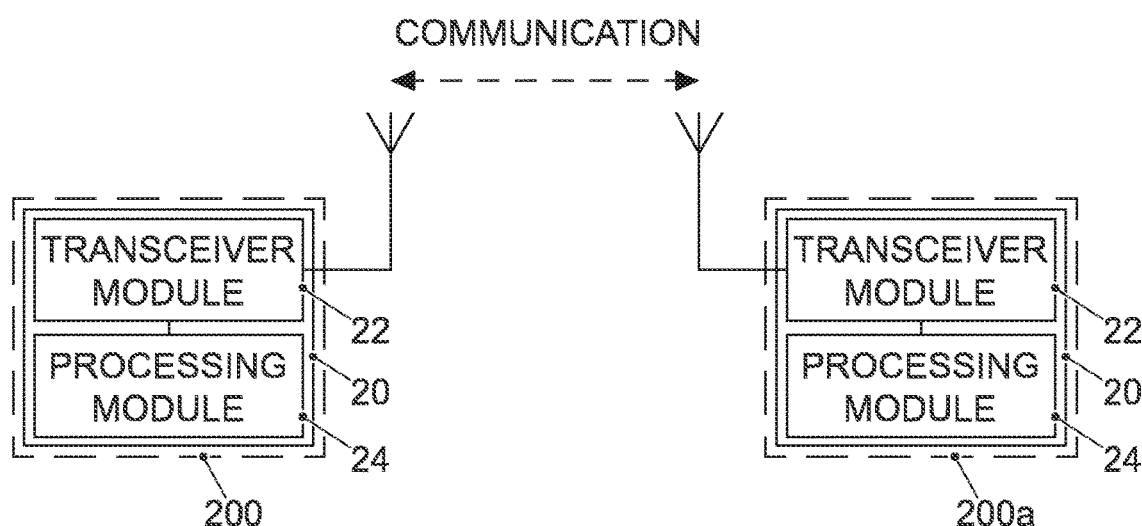
FIG. 2b shows a block diagram of an embodiment of a system.

FIG. 2a shows a block diagram of an embodiment of an apparatus 20 for a wireless communication device 200. FIG. 2a further shows the wireless communication device 200 comprising the apparatus 20. FIG. 2b shows a block diagram of an embodiment of a system comprising the wireless communication device 200 (comprising the apparatus 20) and a further wireless communication device 200a (comprising a corresponding apparatus 20). The wireless communication device and the further wireless communication device may be configured to communicate with each other (e.g. via the corresponding apparatuses 20).

Figure 2C:
FIGS. 2c and 2d show flow charts of embodiments of a method for a wireless communication device.
Figure 2D:
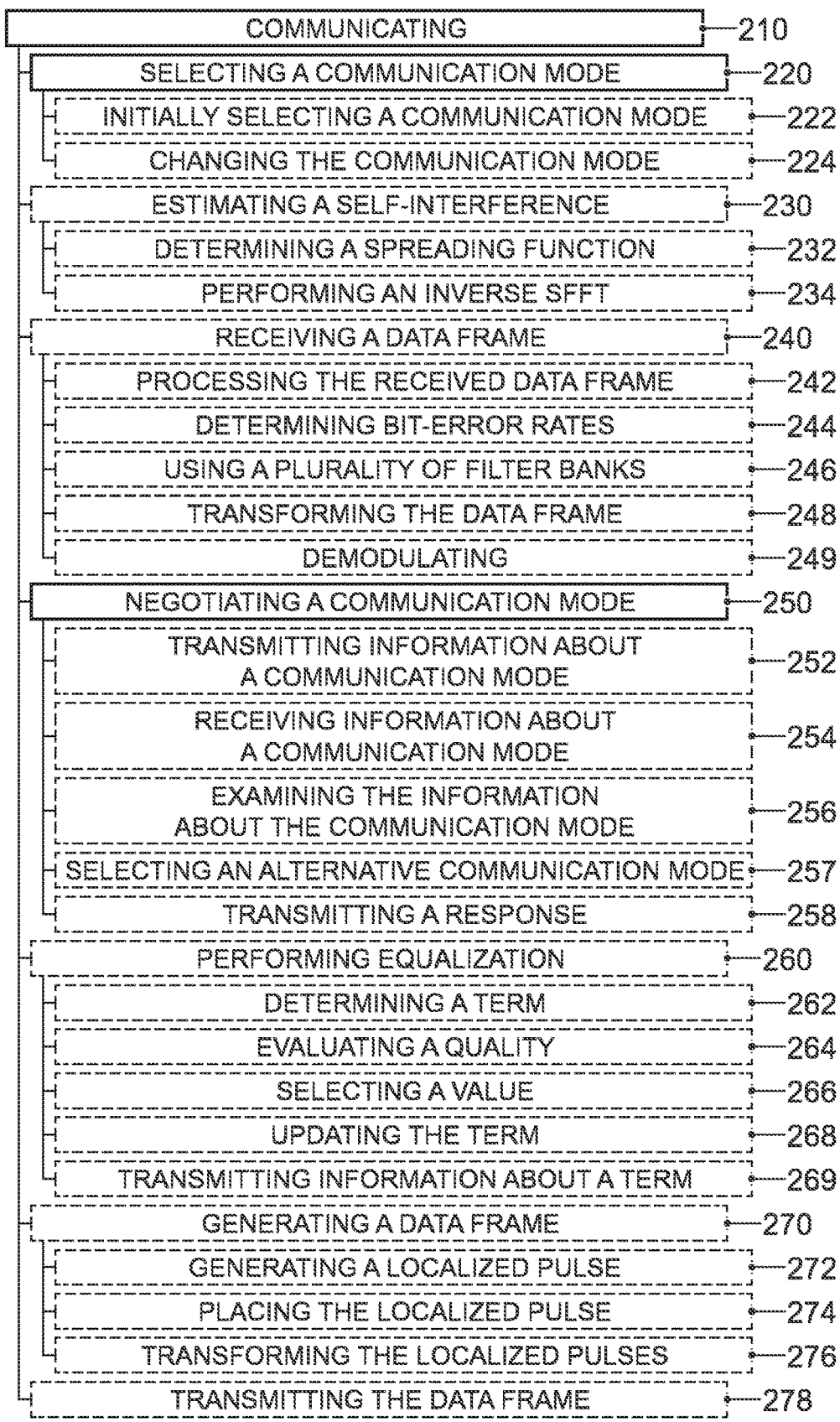

The apparatus 20 comprises a transceiver module 22 for transmitting and receiving wireless transmissions. The apparatus 20 comprises a processing module 24 that is coupled to the transceiver module 22. For example, the processing module 24 is configured to control the transceiver module 22. In general, the processing module 24 may be configured to generate data frames to be transmitted via the transceiver module, and to process data frames that are received via the transceiver module. These data frames may be used for a communication between the wireless communication device 200 and the further wireless communication device 200a. Accordingly, the processing module may be configured to communicate with a further wireless communication device via the transceiver module 22. The communication with the further wireless communication device is based on a transmission of data frames between the wireless communication device 200 and the further wireless communication device 200a. Each data frame is based on a two-dimensional grid in a time-frequency plane having a time dimension resolution and a frequency dimension resolution. The processing module 24 is configured to select a communication mode from a plurality of communication modes for the communication between the wireless communication device and the wireless communication device. The communication mode defines a combination of a frequency dimension resolution and a time dimension resolution of the two-dimensional grid in the time-frequency plane. The processing module 24 is configured to negotiate a communication mode of the plurality of communication modes to select for a future communication between the wireless communication device and the further wireless communication device with the further wireless communication device FIGS. 2c and 2d show flow charts of embodiments of a corresponding method for the wireless communication device 200. Features described in connection with the apparatus and wireless communication devices of FIGS. 2a to 2b may be likewise applied to the method of FIGS. 2c and/or 2d, e.g. as method steps of the method. The method comprises communicating 210 with the further wireless communication device. The method comprises selecting 220 the communication mode from the plurality of communication modes for the communication between the wireless communication device and the wireless communication device. The method comprises negotiating 250 a communication mode of the plurality of communication modes to select for a future communication between the wireless communication device and the further wireless communication device with the further wireless communication device.

The following description relates both to the apparatus and wireless communication devices of FIGS. 2a and/or 2b, and to the method of FIGS. 2c and/or 2d.

Embodiments of the present disclosure relate to wireless communication devices and to an apparatus, a method and a computer program of such wireless communication devices. In the following, two wireless communication devices may be assumed that communicate with each other. This communication is usually performed using wireless transmissions that are exchanged between the two wireless communication devices over a (wireless) channel. In at least some embodiments, the channel may be assumed to be a doubly-dispersive channel. This communication may be sub-divided into smaller and smaller units. In general, in wireless communication, a frame or data frame is considered to be a coherent unit that comprises or represents a plurality of symbols. For example, a frame may be defined as cyclically repeated data block that comprises (or consists of) one or a plurality of time slots. In these time slots, data may be transmitted via a plurality of different carrier frequencies. For example, in embodiments each frame comprises a plurality of time slots, which are transmitted via a plurality of carrier frequency. Correspondingly, the data frame may be considered to be transmitted in the time frequency plane, wherein the time slots span across the time dimension of the time-frequency plane, and wherein the carrier frequencies span across the frequency dimension of the time-frequency plane. This time-frequency plane can be used to model a (logical) grid that spans via the time dimension and the frequency dimension. This is a logical construct, which is, during transmission of the data frames, mapped to the time slots and carrier frequencies. In general, this grid in the time-frequency plane is delimited by the bandwidth range being used to transmit the data frame, and by the time that is used to transmit the frame (the time being subdivided into the one or the plurality of time slots). Accordingly, in embodiments, each data frame is based on a two-dimensional grid in a time-frequency plane having a time dimension resolution and a frequency dimension resolution.

In at least some embodiments, the data frames are Orthogonal Time-Frequency Spreading (OTFS) data frames, e.g. having the properties that have been laid out above. For example, each data frame (or a subset of the data frames) may be based on the frame structure shown in FIG. 1. In this case, the data frame that is transmitted in time and frequency is derived from a different representation of data, from the delay-Doppler representation. In the delay-Doppler representation, signals are represented in the delay-Doppler plane. The delay-Doppler representation can be transformed using the so-called (inverse) Symplectic Finite Fourier Transform (SFFT) to obtain the time-frequency representation. Accordingly, the two-dimensional time-frequency grid may be derived from the two-dimensional grid in a delay-Doppler plane having a delay dimension and a Doppler dimension. For example, the two-dimensional time-frequency grid may be derived from the two-dimensional grid in a delay-Doppler plane having a delay dimension and a Doppler dimension using the inverse SFFT. To transform the grid from the time-frequency plane to the delay-Doppler plane, the SFFT may be used. During signal processing, e.g. by the processing module, the grids in the delay-Doppler plane and the time-Frequency plane may be represented using two-dimensional matrices, wherein each element of the matrix represents an element of the corresponding grid. The corresponding operations, e.g. the SFFT and the inverse SFFT, may be performed on the matrix representing the respective grid.

In general, the processing module may be configured to receive and/or transmit the data frames via the transceiver module 22. Accordingly, the method may comprise transmitting and/or receiving data frame, e.g. via a transceiver module of the wireless communication device, such as the transceiver module 22. Accordingly, the processing module may be configured to generate the data frames that are to be transmitted. For example, the processing module 24 may be configured to generate a data frame for the communication from a plurality of data symbols by generating, for each data symbol, a localized pulse. Accordingly, the method may comprise generating 270 the data frame for the communication from the plurality of data symbols by generating 272, for each data symbol, a localized pulse. This localized pulse may represent the data symbol. For example, a Quadrature Amplitude Modulation may be used to represent the data symbol within a localized pulse. In various embodiments, the localized pulse may be generated using a quasi-periodic function, i.e. a function that is periodic up to a multiplicative phase. The processing module may be further configured, in order to generate the data frame, to place the localized pulse on a point on the two-dimensional grid in the delay-Doppler plane. In other words, in order to generate the data frame, the method may comprise placing 274 the localized pulse on a point on the two-dimensional grid in the delay-Doppler plane. Again, this is merely an illustrative representation. Within the processing module, each point of the grid may be represented by an element of the matrix for the delay-Doppler representation. The processing module may be further configured, in order to generate the data frame, to transform the plurality of localized pulses on the delay-Doppler plane onto the time-frequency plane using an inverse symplectic Fourier transform. In other words, in order to generate the data frame, the method may comprise transforming 276 the plurality of localized pulses on the delay-Doppler plane onto the time-frequency plane using the inverse symplectic Fourier transform. Again, this operation may be performed on the elements of the matrix representing the grid in the delay-Doppler plane, to obtain the matrix that represents the grid in the time-frequency plane. The processing module may be further configured to transmit the generated data frame via the transceiver module 22 (to the further wireless communication device). In other words, the method may comprise transmitting 278 the generated data frame (via a transceiver module of the wireless communication device). This may be done using a sequence of multi-carrier symbols.

Correspondingly, the processing module may be configured to process the received data frames. For example, the processing module 24 may be configured to receive a data frame via the transceiver module 22. Accordingly, the method may comprise receiving 240 the data frame. The processing module may be configured to transform the data frame from the time-frequency plane into the delay-Doppler plane (e.g. using an SFFT on the matrix representing the grid in the time-frequency plane). The method may comprise transforming 248 the data frame from the time-frequency plane into the delay-Doppler plane. The processing module may be configured to demodulate a plurality of localized pulses at the points of the two-dimension plane in the delay-Doppler plane. Accordingly, the method may comprise demodulating 249 the plurality of localized pulses at the points of the two-dimension plane in the delay-Doppler plane. The plurality of localized pulses may represent a plurality of data symbols that were transmitted using the received data frame.

In general, both the wireless communication device and the further wireless communication device may be any type of wireless communication device, e.g. mobile communication devices, such as smartphones, wearables, mobile sensors or wireless communication devices of vehicles, or stationary wireless communication devices, such as base stations or roadside stations (if used in a vehicular context. Accordingly, the wireless communication device and/or the wireless communication device may be one of a mobile wireless communication device, a vehicular wireless communication device, a stationary wireless communication device and a base station. For example, the wireless communication device may be a vehicular wireless communication device (e.g. of a vehicle that drives along a road), and the further wireless communication device may be a stationary wireless communication device, such as a roadside unit that is placed at the side of the road or a base station of a (vehicular) mobile communication system. Accordingly, the communication between the wireless communication device and the further wireless communication device may be a communication via a vehicular communication protocol. In more general terms, however, embodiments may be used with any kind of mobile communication system that supports frames comprising a plurality of time slots and a plurality of subcarriers. Accordingly, the wireless communication device and the further wireless communication device may communicate via a mobile communication system may, for example, one of the Third Generation Partnership Project (3GPP)-standardized mobile communication networks. The mobile or wireless communication system may correspond to, for example, a 5th Generation system (5G), a Long-Term Evolution (LTE), or an LTE-Advanced (LTE-A)-based mobile communication system. In other words, the data frames may be data frames of a mobile communication system.

As laid out above, grids (in the time-frequency plane and in the delay-Doppler plane) are used to represent the signals. In OTFS, computationally feasible equalizers may suffer from mismatched time-frequency grids. Parity may be achieved with perfect gird matching of the Gabor synthesis and analysis pulses with the delay and Doppler spread of the channel. However, this might not be achieved in practice due to the varying mobility of users, and correspondingly changing channels. This may lead to performance degradation (higher error rates). In OTFS, different channel conditions and appropriate grid matching have not been studied. When such an OTFS system is implemented, performance degradation may be observed, and the expected performance might not achieved. In many cases, this may be caused by a mismatch of the grid, as perfect grid matching is assumed in publications related to OTFS so far. Unfortunately, grid mismatch may cause significant performance degradations for an OTFS system, as is later shown in FIGS. 3a to 4d. Embodiments may thus use mobility modes (i.e. communication modes) with distinct grid-matching for different doubly dispersive communication links (i.e. channels). For example, a communication mode may provide a high Doppler and less delay resolution or high delay and less Doppler resolution or an equal resolution in both domains and further constellations.

In embodiments, the processing module 24 is configured to select a communication mode from a plurality of communication modes for the communication between the wireless communication device and the wireless communication device. In general, the selection of the communication mode may be seen akin to choosing a time resolution and frequency resolution for the grid in the time-frequency plane that matches the channel that is used for the communication between the wireless communication devices. For example, in different scenarios, signals transmitted via the channel may experience different amounts of delay spread and Doppler spread. To account for such different channels, the grid may be chosen such that the respective properties of the channel are taken into account. For lower relative velocities, less resolution in the time domain may be required, and a higher resolution in the frequency domain may be desired if higher delays occur. For example, at higher relative velocities, a grid having a higher resolution (i.e. more points) in the time dimension may be advantageous (to allow for a higher Doppler spread), while at lower relative velocities, a grid having a higher resolution (i.e. more points) in the frequency dimension may be advantageous.

In general, it may be possible to select "the" perfect grid for each communication. In practice however, it may be more useful to limit the number of grid configurations (or communication modes), in order to reduce an implementation complexity of the wireless communication device. Accordingly, the plurality of communication modes may be a pre-defined set of communication modes (i.e. having a fixed number of communication modes). For example, the plurality of communication modes may be pre-defined by a mobile communication system being used for the communication. For example, the plurality or pre-defined set of communication modes may comprise at least three, or at least five, at least seven different communication nodes. For example, the plurality of pre-defined set of communication modes may comprise at most 16, or at most 8, at most 5, or at most three communication modes. For example, the communication modes of the plurality of communication modes may be identified using an identifier, which may be transmitted between the wireless communication devices to negotiate the communication mode that is to be selected for the communication.

The communication mode defines a combination of a frequency dimension resolution and a time dimension resolution of the two-dimensional grid in the time-frequency plane. In other words, the communication mode may define a number of points N along a time dimension of the two-dimensional grid in the time-frequency plane and a number of points M along a frequency dimension of the two-dimensional grid in the time-frequency plane. Accordingly, the time dimension resolution may define a number of points N along a time dimension of the two-dimensional grid in the time-frequency plane. The frequency dimension resolution may define a number of points M along a frequency dimension of the two-dimensional grid in the time-frequency plane. These may be the same dimensions that are used for the grid in the delay-Doppler plane. For example, M may be the number of points along the delay dimension of the two-dimensional grid in the delay-Doppler plane, and N may be the number of points along the Doppler dimension of the two-dimensional grid in the delay-Doppler plane. For example, the two-dimensional grid in the time-frequency plane and/or the two-dimensional grid in the time-frequency plane may have M×N points.

In some embodiments, there may be constraints that limit the number of different communication modes. For example, both N and M may be a power of two. Additionally, the product of N and M may be the same for all of the communication modes. In other words, the product of the number of points along the time dimension and the number of points along the frequency dimension of the two-dimensional grid in the time-frequency plane may be the same for the communication modes of the plurality of communication modes.

In at least some embodiments, the plurality (or pre-defined set) of communication modes may comprise at least one communication mode that is suitable for a broad range of communication nodes. Such communication modes may, for example, be used as a default communication mode, that may be initially used when the communication between the wireless communication devices is established. In general, such communication modes may be found for values of N and M that are within the same order of magnitude. For example, the plurality of communication modes may comprise at least one communication mode defining a combination of a frequency dimension resolution and a time dimension resolution wherein $M \leq N$ and $4M \geq N$ or wherein $M \geq N$ and $M \leq 4N$. In particular, the plurality of communication modes may comprise at least one communication mode defining a combination of a frequency dimension resolution and a time dimension resolution wherein $M=N$ (i.e. the same number of points along the time and the frequency dimension). Such a communication modes may be used as default communication mode.

Other communication modes may either satisfy $M>N$ or $M<N$. For example, the plurality of communication modes may comprise at least one communication mode defining a combination of a frequency dimension resolution and a time dimension resolution wherein $M>N$. For example, the plurality of communication modes may comprise at least one communication mode defining a combination of a frequency dimension resolution and a time dimension resolution wherein $M \geq 4N$, at least one communication mode defining a combination of a frequency dimension resolution and a time dimension resolution wherein $M \geq 16N$, and/or at least one communication mode defining a combination of a frequency dimension resolution and a time dimension resolution wherein $M \geq 256N$. Such communication modes may be used in scenarios with low relative velocities.

Additionally or alternatively, the plurality of communication modes may comprise at least one communication mode defining a combination of a frequency dimension resolution and a time dimension resolution wherein $M<N$. For example, the plurality of communication modes may comprise at least one communication mode defining a combination of a frequency dimension resolution and a time dimension resolution wherein $4M \leq N$, at least one communication mode defining a combination of a frequency dimension resolution and a time dimension resolution wherein $16M \leq N$, and/or at least one communication mode defining a combination of a frequency dimension resolution and a time dimension resolution wherein $256M \leq N$. Such communication modes may be used in scenarios with higher relative velocities.

In addition to the dimensions of the grid, the communication mode may also define the pulse shape to be used (e.g. when modulating the plurality of symbols in the delay-Doppler plane). In other words, the communication mode may define a pulse shape to use for the communication. For example, the pulse shape may be one of a Gaussian pulse, a rectangular pulse, and another pulse form.

In general, communication modes may be selected at least two times during the communication—initially, i.e. for the first wireless transmission (of a communication session) between the wireless communication device and the further wireless communication device, and during the communication (session), e.g. in order to select a communication mode that better fits the channel between the wireless communication devices. When using different time-frequency grids depending on the radio channel conditions some grids match the channel good others not so much. In fact, if the wrong grid is selected the performance and hence the bit error rate (BER) might increase drastically. This might not be acceptable in some cases as for e.g. for the control channel and some negotiation phases between transmitter and receiver.

Therefore, the processing module may be configured to initially select a communication mode for the communication, i.e. to select a communication to use for a first data frame being exchanged between the wireless communication devices. In other words, the processing module 24 may be configured to initially select a default communication mode of the plurality of communication modes for the communication between the wireless communication device and the further wireless communication device. Accordingly, the method may comprise initially selecting 222 a default communication mode of the plurality of the plurality of communication modes for the communication between the wireless communication device and the further wireless communication device.

In various embodiments, a default communication mode (or "safe" communication mode) may be initially selected. For example, the safe mode may be a grid scaling mode (time-frequency grid) having an average performance, which may be used in almost all environments. Such a safe mode may be chosen with an equal time-frequency resolution. In general, the plurality or pre-defined set of communication mode may comprise a single (or low number, such as three) default communication mode. This communication mode may be a communication mode that works in a variety of scenarios. For example, the default communication mode may be a "robust" communication mode, in the sense, that it does not require specific channel properties in order to provide adequate performance. In other words, the default communication mode may be a communication mode that provides robust grid matching in a plurality of different delay-spread and Doppler-spread scenarios.

Such a default communication mode may, for example, have values of M and N that are in the same order of magnitude. For example, the default communication mode may defines a combination of a frequency dimension resolution and a time dimension resolution wherein $M \leq N$ and $4M \geq N$ or wherein $M \geq N$ and $M \leq 4N$, e.g. where $M=N$. M and N may also be chosen such, that there are other communication modes that have lower and higher values of M and N. In other words, the default communication mode may define a combination of a frequency dimension resolution and a time dimension resolution wherein the number of points N along the time dimension is larger than a minimal number of points $N_{min}$ and smaller than a maximal number of points $N_{max}$ along the time dimension, and wherein the number of points M along the frequency dimension is larger than a minimal number of points $M_{min}$ and smaller than a maximal number of points $M_{max}$ along the frequency dimension. The minimal number of points and the maximal number of points along the time or frequency dimension may be defined by other communication modes of the plurality of communication modes, i.e. $N_{max}$ may be the highest value of N among the plurality of communication modes, and $N_{min}$ may be the lowest number of N among the plurality of communication modes. Accordingly, $M_{max}$ may be the highest value of M among the plurality of communication modes, and $M_{min}$ may be the lowest number of M among the plurality of communication modes.

Alternatively, a trial-and-error strategy may be employed. How does the receiver know which grid scaling was used by the transmitter if grid scaling is not static and changes depending on the radio conditions? The receiver may (need to) use the same grid at the matched filter as the transmitter has used. In other systems, a static grid may be used. In embodiments, however, a plurality of communication modes may be used. For example, the plurality of communication may comprise (at least) three different grids. The first grid with high Doppler and low delay resolution, the second with low Doppler and high Delay resolution, and the third with equal delay Doppler resolution. The transmitter may (need to) use one of these grids (e.g. of the three grids) which are used at the receiver. In embodiments, the receiver may use several grids for the matched filter and select the grid which leads to the lowest BER.

For example, when receiving a (first) data frame from the wireless communication device, the processing module may process the received data frame using matched filters that are based on two or more communication modes (e.g. three communication modes, dependent on the number of filter banks that can be used in parallel), in order to find out which communication mode was selected. In other words, the processing module 24 may be configured to receive a data frame from the further wireless communication device via the transceiver module 22. Accordingly, the method may comprise receiving 240 a data frame from the further wireless communication device. The processing module 24 may be configured to process the received data frame using matched filters that are based on two or more communication modes of the plurality of communication modes. The corresponding method may comprise processing 242 the received data frame using matched filters that are based on two or more communication modes of the plurality of communication modes. The processing may be performed in parallel, e.g. in order to quickly evaluate two, three or more communication modes at the same time. In other words, the processing module 24 may be configured to process the received data frame in parallel using the matched filters that are based on the two or more communication modes. Accordingly, the received data frame may be processed 242 in parallel using the matched filters that are based on the two or more communication modes. For this, a plurality of filter banks may be used that are based on the matched filters that are based on the two or more communication modes. In other words, the processing module 24 may be configured to use a plurality of filter banks that are based on two or more communication modes of the plurality of communication modes to process the received data frame. The method may comprise using 246 a plurality of filter banks that are based on two or more communication modes of the plurality of communication modes to process 242 the received data frame. Alternatively or additionally, a multi-step procedure may be used wherein matched filters that are based on a first (or two or more first) communication mode(s) are used in a first time-step, and wherein matched filters that are based on a second (or two or more second) communication mode(s) are used in a first time-step, the first and second communication mode(s) being different. In this case, subsequently, a number of different communication modes may be tried until the correct communication mode is selected.

The selection of the communication mode may be based on a result of the processing. For example, a result of the processing may be a bit-error rate that is achieved after the data frame is demodulated based on the matched filters that are based on the two or more different communication modes. If the matched filters of one of the communication modes yields a low bit-error rate, the respective communication mode may be selected. In other words, the processing module 24 may be configured to determine bit-error rates that result from the use of the matched filters that are based on the two or more communication modes. The processing module may be configured to select the communication mode based on the determined bit-error rates (e.g. by selecting the communication mode yielding the lowest bit-error rate). Accordingly, the method may comprise determining 244 bit-error rates that result from the use of the matched filters that are based on the two or more communication modes. The method may comprise selecting 220 the communication mode based on the determined bit-error rates.

After the communication has been initiated, the communication mode to be used for the (future) communication may be changed. In other words, the communication between the wireless communication device and the further wireless communication device may comprise a plurality of data frames that are transmitted between the wireless communication device and the further wireless communication device. The processing module 24 may be configured to change the communication mode during the communication between the wireless communication device and the further wireless communication device, e.g. by selecting a different communication mode from the plurality of communication modes (i.e. different from an initially or previously selected communication mode). Accordingly, the method may comprise changing 224 the communication mode during the communication between the wireless communication device and the further wireless communication device, e.g. by selecting 226 a different communication mode from the plurality of communication modes.

In various embodiments, the communication that is selected for the communication, e.g. when initiating the communication, or when the communication mode is changed during the communication, may be selected on one or more selection criteria (also termed "mobility mode selection"). But how does the transmitter find an appropriate grid scale, in order to avoid performance degradation? In conventional OTFS systems, the grid is constant and defined in the standard. In embodiments, on the other hand, the processing module may be configured to estimate the spreading function and hence the characteristics of the radio channel (delay, Doppler). Accordingly, one of the criteria for selecting a communication mode may be a spreading function (i.e. a delay spread and/or a Doppler spread) of the channel that is used for the communication. The spreading function, may, in turn be used to select the appropriate communication mode.

Accordingly, the processing module 24 may be configured to select the communication mode from the plurality of communication modes based on an estimated self-interference of the plurality of communication modes. In general, self-interference is interference that is caused by the signal itself, e.g. due to delays caused by multipath propagation or due to frequency shifts that happen due to the Doppler effect. For example, the self-interference incurred at a symbol of a plurality of symbols of the data frame may originate from the other symbols of the plurality of symbols of the data frame. Accordingly, a self-interference of a communication node may be a self-interference that is incurred when selecting said communication mode. The self-interference of a communication mode is based on the channel that is used for communicating—different channels may lead to different amounts and/or properties of self-interference. The self-interference may be characterized by two terms—the delay spread and the Doppler spread. In other words, the self-interference may be based on the delay-Spread and the Doppler spread of the channel, and based on the communication mode that is selected for the communication. The delay spread and the Doppler spread may also be denoted the "spreading function" of the channel.

Accordingly, the processing module may be configured to estimate the self-interference using a previously received data frame. Accordingly, the method may comprise estimating 230 the self-interference using a previously received data frame. This can be done based on the received pilot tone of the OTFS frame in the delay Doppler domain. For example, each data frame may comprise a (single) pilot symbol, a plurality of guard symbols, and a plurality of data symbols (see, for example, FIG. 1) (in the delay-Doppler representation/on the two-dimensional delay-Doppler grid). The processing module 24 may be configured to estimate the self-interference using the pilot symbol of a previously received data frame. Accordingly, the method may comprise estimating 230 the self-interference using the pilot symbol of a previously received data frame. In particular, the spreading function may be determined using the pilot symbol. In other words, the processing module 24 may be configured to determine a spreading function of a channel that is used for the communication based on the pilot symbol of the previously received data frame. Accordingly, the method may comprise determining 232 the spreading function of a channel that is used for the communication based on the pilot symbol of the previously received data frame. In other words, the self-interference (or spreading function) may be classified based on received pilot(s) tone in the past.

In various embodiments, the self-interference, and therefore the spreading function, may be determined by merely de-spreading components of the received data frame that belong to the guard symbols (and the pilot symbol), and deduce the self-interference from the respective terms. In other words, each data frame may comprise a plurality of guard symbols surrounding the pilot symbol on the two-dimensional grid in the delay-Doppler plane. The processing module 24 may be configured to perform a symplectic Fourier transform on the received data frame (i.e. the de-spreading). Accordingly, the method may comprise performing 234 a symplectic Fourier transform on the received data frame. The symplectic Fourier transform may be performed for the points on the two-dimensional grid in the delay-Doppler plane corresponding to the pilot symbol and the subset of the plurality of guard symbols (see e.g. equations 7 and 20). The spreading function may be determined using a result of the symplectic Fourier transform. In other, the result of the symplectic Fourier transform may indicate the self-interference and/or the spreading function of the channel.

The processing module 24 may be configured to select the communication mode based on the spreading function of the channel. For this, the approach proposed by Jung and Wunder in "WSSUS pulse design problem in multicarrier transmission" may be used. Under a fixed-bandwidth constraint W and a fixed-bandwidth efficiency E (in complex symbols), an optimal number for N (the number of points on the frequency dimension, i.e. the number of subcarriers) may be calculated. For example, the following may be given:

$$TF = \epsilon^{-1} \text{ (assuming } \Lambda = \text{diag}(T, F)\text{)}, \frac{T}{F} = \frac{\tau_d}{2v_d}, \text{ and } F = \frac{W}{N}$$

(see e.g. equations 1 and 2).

$$N = W \cdot \sqrt{\frac{\tau_d}{2\epsilon \cdot v_d}} = W \cdot \sqrt{\frac{\tau_d c}{2\epsilon \cdot v f_c}}$$

where $\tau_d$ is the delay spread, $v_d$ is the Doppler spread, v is the speed between wireless communication device and further wireless communication device (transmitter and receiver), c the speed of light, and $f_c$ the carrier frequency. Moreover, in FFT-based polyphase filtering, N may be power of two. The above formula represents a tradeoff between time and frequency-division multiplexing in time-variant channels.

The N that was calculated above may be used to select a communication mode from the plurality or-predefined set of communication modes (by selecting the communication having an N that is closest to the N that was calculated using the formula above). The pre-defined set of communication nodes may represent communication nodes that are allowed for the communication and/or known by the receiver.

The above equation represents a concrete implementation of a determination of a value for N. Other implementations are possible. In general, the processing module 24 may be configured to select the communication mode based on a delay spread of a channel that is used for the communication and based on a relative velocity between the wireless communication device and the further wireless communication device (see e.g. the third part of the equation). The processing module 24 may be configured to select the communication mode further based on spectral efficiency, based on a bandwidth, and based on a carrier frequency of the communication.

In some embodiments, the communication mode may define a pulse shape to use for the communication. Accordingly, the processing module may be configured to select a pulse shape from a plurality of pulse shapes (e.g. a pre-defined set of pulse shapes), and select the communication mode based on the selected pulse shape. The method may comprise selecting a pulse shape from a plurality of pulse shapes, and selecting the communication mode based on the selected pulse shape. In general, a suitability of a pulse shape for a certain channel (and combination of N and M) is based on two parameters—a channel gain that can be obtained using a pulse shape at a point of the delay-Doppler (or time-frequency) grid, and a self-interference power incurred using the pulse shape (from the other points of the delay-Doppler (or time-frequency) grid). In general, the better the ratio of channel gain over self-interference power, the more suitable the pulse shape is for that channel. This ratio may also be used to calculate the Signal-to-Interference-and-Noise-Ratio (SINR) for the pulse shape. In some embodiments, the processing module may be configured to select the pulse shape based on the ratio of channel gain over self-interference power of the pulse shapes of the plurality of pulse shapes. In some embodiments, the processing module may be configured to determine a suitable pulse shape by iteratively maximizing the channel gain of the pulse shape and by iteratively minimizing the self-interference of the pulse shape. Accordingly, the method may comprise determining a suitable pulse shape by iteratively maximizing the channel gain of the pulse shape and by iteratively minimizing the self-interference of the pulse shape. In general, the pulse shape may be selected from the plurality of pulse shapes based on the determined, suitable pulse shape. For example, the pulse shape may be determined using the approach taken in section III of Jung and Wunder in "WSSUS pulse design problem in multicarrier transmission".

In general, if grid scaling and pulse-shaping are used, then the same grid (i.e. communication mode) may (need to) be selected at the transmitter as well as at the receiver. In case that the transmitter select a different grid as the receiver, then the receiver might not be able to demodulate the wave form. This selection may be performed unilaterally, i.e. the wireless communication device that initiates the connection selects the communication mode, and the other follows suit. Alternatively, the wireless communication device may be decided upon bilaterally. For example, a negotiation may be performed between the wireless communication devices. In other words, the wireless communication devices may perform mobility mode negotiation. In other words, communication/mobility mode (grid scaling/pulse-shaping) negotiation may be done between transmitter and receiver.

For example, in an exemplary embodiment, at a first step, the communication node 1 (e.g. either the wireless communication device or the further wireless communication device) which starts the communication begins to use a time-frequency grid that is also known by the receiving node 2 (the other of the wireless communication device), for example the default communication mode. At a second step, the receiving node 2 may be able to calculate the best grid scaling/pulse shaping using the spreading function, e.g. based on Jung and Wunder: "WSSUS pulse design problem in multicarrier transmission". Accordingly, the receiving node may propose a time-frequency grid and pulse shaping (obtained from (1)) to node 1. At a third step, node 1 sends its acceptance to node 2 or proposes a new grid scaling, and requests acceptance from node 2. At a fourth step, node 2 and node 1 may change their grids and communicate with the new grid scaling (i.e. with a new communication mode).

In more general terms, the processing module 24 may be configured to negotiate a communication mode of the plurality of communication modes to select for future communication between the wireless communication device and the further wireless communication device with the further wireless communication device. Accordingly, the method may comprise negotiating 250 a communication mode of the plurality of communication modes to select for future communication between the wireless communication device and the further wireless communication device with the further wireless communication device.

As stated above, the processing module 24 may be configured to initially select a communication mode that is known at the wireless communication device and at the further wireless communication device for the communication between the wireless communication device and the further wireless communication device. Accordingly, the method may comprise initially selecting 222 a communication mode that is known at the wireless communication device and at the further wireless communication device for the communication between the wireless communication device and the further wireless communication device. This may either be a default communication mode, or a communication mode that was used for a previous communication between the wireless communication devices. In other words, the processing module 24 may be configured to initially select a default communication mode for the communication between the wireless communication device and the further wireless communication device. Accordingly, the method may comprise initially selecting 222 a default communication mode of the plurality of the plurality of communication modes for the communication between the wireless communication device and the further wireless communication device. Alternatively, the processing module 24 may be configured to initially select a communication mode that was selected for a previous communication between the wireless communication device and the further wireless communication device for the communication between the wireless communication device and the further wireless communication device, e.g. for the latest previous communication between the wireless communication device and the further wireless communication device. Accordingly, the method may comprises initially selecting 222 a communication mode that was selected for a previous communication between the wireless communication device and the further wireless communication device for the communication between the wireless communication device and the further wireless communication device.

The initially selected communication mode may be used to negotiate the communication to select for a future communication between the wireless communication device and the further wireless communication device. In some embodiments, the negotiation may be initiated by the wireless communication device. For example, the processing module 24 may be configured to transmit information about a communication mode to select for a future communication between the wireless communication device and the further wireless communication device to the further wireless communication device (e.g. by transmitting an indicator to the further wireless communication device). Accordingly, the method may comprise transmitting 252 information about a communication mode to use for a future communication between the wireless communication device and the further wireless communication device to the further wireless communication device. For example, the information about the communication mode may be transmitted using the initially selected communication mode. The processing module may be configured to select the communication mode for the future communication with the further wireless communication device, e.g. if an acknowledgement (or no negative acknowledgement) is received from the further wireless communication device. Accordingly, the method may comprise selecting 220 the communication mode for the future communication with the further wireless communication device. Again, the communication mode to be selected may be selected based on the spreading function of the channel. In other words, the processing module 24 may be configured to select the communication mode for the future communication based on the spreading function of the channel (e.g. as shown above). Accordingly, the method may comprise selecting 220 the communication mode for the future communication based on the spreading function of the channel.

In some cases, the negotiation may be initiated by the further wireless communication device, or the further wireless communication device may provide a counterproposal if it disagrees with the transmitted information on the communication mode. In this case, information about a communication mode to select for a future communication between the wireless communication device and the further wireless communication device may be received from the further wireless communication device. In other words, the processing module 24 may be configured to receive information about a communication mode to select for a future communication between the wireless communication device and the further wireless communication device from the further wireless communication device. Accordingly, the method may comprise receiving 254 information about a communication mode to use for a future communication between the wireless communication device and the further wireless communication device from the further wireless communication device. Similar to the reverse direction indicated above, the information about the communication mode may comprise an indicator of the communication code to select for the future communication, or may otherwise indicate the communication mode to use. In general, the communication mode indicated by the information about the communication mode may be comprised in the plurality of communication modes. Furthermore, the communication mode indicated by the information about the communication mode may be both the wireless communication device and the further wireless communication device. The processing module 24 may be configured to select the communication mode for the future communication with the further wireless communication device. Accordingly, the method may comprise selecting 220 the communication mode for the future communication with the further wireless communication device.

In some cases, the communication mode proposed by the further wireless communication device may be selected "as is" for the future communication. Alternatively, the wireless communication device that has received the information about the communication may examine, whether the communication mode is suitable, e.g. based on the properties of the channel, and/or based on the capabilities of the wireless communication device. In other words, the processing module 24 may be configured to examine the information about the communication mode to select for future communication based on an examination criterion. Accordingly, the method may comprise examining 256 the information about the communication mode to use for future communication based on the examination criterion. For example, the examination criterion may be based on the spreading function of the channel used for the communication. For example, the wireless communication device may be configured to determine an optimal M and/or N based on the spreading function of the channel, and to compare the M and/or N of the communication mode of the received information about the communication mode with the optimal M and/or N (and to deem the examination criterion not fulfilled if the discrepancy is too large). Additionally or alternatively, the examination criterion may be based on the capabilities of the wireless communication device. For example, if the wireless communication device does not support the communication mode of the received information about the communication mode, the examination criterion may be deemed not fulfilled. Based on whether the examination criterion is deemed fulfilled, two options present themselves: If the examination criterion is deemed fulfilled, the wireless communication device may select the communication mode of the received information about the communication mode, if not, the wireless communication device may ask for another proposal, or may provide an alternative communication mode. In other words, the processing module 24 may be configured to select the communication mode for the future communication with the further wireless communication device if the communication mode to use for future communication if the examination criterion is fulfilled. Accordingly, the method may comprise selecting 220 the communication mode for the future communication with the further wireless communication device if the communication mode to use for future communication if the examination criterion is fulfilled. The processing module 24 may be configured to transmit a response to the further wireless communication device if the examination criterion is not fulfilled. Accordingly, the method may comprise transmitting 258 a response to the further wireless communication device if the examination criterion is not fulfilled. The response may comprise information about an alternative communication mode to use for the future communication. Again, the information about the alternative communication may comprise an indicator of the alternative communication mode.

Similar to above, the processing module may be configured to select the alternative communication mode. For example, the processing module 24 may be configured to select the alternative communication mode for the future communication based on the spreading function of the channel. Accordingly, the method may comprise selecting 257 the alternative communication mode for the future communication based on the spreading function of the channel.

In general, both wireless communication devices may be configured to transmit and receive the information about the (alternative) communication mode to select for the future communication between the wireless communication device and the further wireless communication device, and to use the appropriate functionality, depending on which wireless communication device initiates the negotiation. The processing module 24 may be configured to change the communication mode of the communication based on the transmitted and/or receive information about the communication mode, e.g. at a point in time indicated by the information about the communication mode. Accordingly, the method may comprise changing the communication mode of the communication based on the transmitted and/or receive information about the communication mode.

In the following, the channel estimation, the equalization and a self-interference which remains in the OTFS transceiver structure that is caused by pulse and grid mismatch is discussed. In particular, the link between the equalization as a 2D deconvolution and the true channel mapping, given as a twisted convolution, is shown. In particular, the difference between twisted convolution and regular 2D-deconvolution may amount to self-interference.

In embodiments, the impact of self-interference may be quantified. In order to reveal the impact of pulse and grid mismatch in terms of self-interference, the inner product in (13) may be rewritten and computed separately. In the context of this application, • may denote the down-converted and passed into the filterbank values and •* may denote the conjugate transpose). Substituting $\bar{t}=t-\bar{n}T$ gives $$\langle g(t-\bar{n}T) \cdot e^{j2\pi\bar{m}Ft}, \gamma(t-\tau_p-nT)e^{j2\pi(mF+v_d)t}\rangle =$$
$$\langle g(t-\bar{n}T), \gamma(t-nT-\tau_p)e^{j2\pi([m-\bar{m}]F+v_d)t}\rangle =$$
$$\langle g(\bar{t}), \gamma(\bar{t}-[n-\bar{n}]T-\tau_p)e^{j2\pi([m-\bar{m}]F+v_d)[\bar{t}+\bar{n}T]}\rangle =$$
$$e^{j2\pi([m-\bar{m}]F+v_d)\bar{n}T} \times \langle g(\bar{t}), \gamma(\bar{t}-[n-\bar{n}]T-\tau_p)e^{j2\pi([m-\bar{m}]F+v_d)\bar{t}}\rangle =$$
$$e^{j2\pi([m-\bar{m}]F+v_d)\bar{n}T} \cdot A([n-\bar{n}]T+\tau_p, [m-\bar{m}]F+v_d)$$

where $A(\tau, v)=Ag$, $\gamma(\tau, v)=\langle g(t),\gamma(t-\tau)e^{j2\pi vt}\rangle$ is the cross-ambiguity function. With matched pulse shaping one wishes to "approach":

$$A([n-\bar{n}]T+\tau_p p,[m-\bar{m}]F+v_d)\approx \tau(n-\bar{n})\delta(m-\bar{m})A(\tau_p,v_d) \quad (15)$$

for all values $(\tau_p,v_d)\in U$, where U is the set of time-frequency shifts, and where $|U|\neq 0$. On a informal level, this would mean that the expected power $\mathbb{E}(|I_{\bar{m}\bar{n}}|^2)$ (taken over data symbols and channel realizations) of the self-interference term $I_{\bar{m}\bar{n}}$, which may be defined as:

$$I_{\bar{m}\bar{n}} = \sum_{(m,n)\neq(\bar{m},\bar{n})} x_{mn}S_{dp} \quad (16)$$
$$e^{-2\pi(\bar{m}F\tau_p-\bar{n}Tv_d-[m-\bar{m}]F\bar{n}T)}A([n-\bar{n}]T+\tau_p p, [m-\bar{m}]F+v_d)$$

may vanish (i.e. become small). However, since such "idealized" pulses g and γ such that $A_{g\gamma}(\tau,v)\sim\delta(\tau)\delta(v)$ for all the $(\tau,v)$ in consideration above might not exist, $\mathbb{E}(|I_{\bar{m}\bar{n}}|^2)$ may always be non-zero. The idea of matched pulse shaping is then to control expected self-interference power. Thus, self-interference $I_{\bar{m}\bar{n}}$ may be considered in the system model explicitly, yielding:

$$y_{\bar{m}\bar{n}} = x_{\bar{m}\bar{n}} \sum_{(d,p)\in A} \hat{S}_{dp}e^{-j2\pi(\bar{m}F\tau_p-\bar{n}Tv_d)} + I_{\bar{m}\bar{n}} \quad (17)$$

where $\sum_{(d,p)\in A}\hat{S}_{dp}e^{-j2\pi(\bar{m}F\tau_p-\bar{n}Tv_d)}=h_{\bar{m}\bar{n}}$ (the channel) and where the vectors $\hat{S}$ may be defined with components $\hat{S}_{dp}=S_{dp}\cdot A(\tau_p,v_d)$.

Applying $F_s$ to (17) may indicate that in the first order (up to inference) the channel acts as 2D convolution since:

$$Y_{\bar{l}\bar{k}} = \sum_{(\bar{m},\bar{n})\in I} y_{\bar{m}\bar{n}}e^{-j2\pi\left(\frac{\bar{n}\bar{k}}{N}-\frac{\bar{m}\bar{l}}{M}\right)} = \quad (18)$$
$$\sum_{(\bar{m},\bar{n})\in I} (h_{\bar{m}\bar{n}}x_{\bar{m}\bar{n}}+I_{\bar{m}\bar{n}})e^{-j2\pi\left(\frac{\bar{n}\bar{k}}{N}-\frac{\bar{m}\bar{l}}{M}\right)} = \sum_{(\bar{m},\bar{n})\in I} (h_{\bar{m}\bar{n}}x_{\bar{m}\bar{n}})e^{-j2\pi\left(\frac{\bar{n}\bar{k}}{N}-\frac{\bar{m}\bar{l}}{M}\right)} + I_{\bar{l}\bar{k}}$$

and pointwise multiplication in the time-frequency plane is (circular) 2D-convolution in the delay-Doppler plane:

$$Y_{\bar{l}\bar{k}}=(H*X)_{\bar{l}\bar{k}}+I_{\bar{l}\bar{k}} \quad (19)$$

Embodiments may provide a delay-Doppler channel estimation. The channel with the pilot sent by the transmitter in the DD domain may be estimated. For this, the $F_s^{-1}$ may be applied to half of the guard area, where the channel impulse response (CIR) is obtained (see e.g. P. Raviteja, K. et al: "Embedded pilot-aided channel estimation for OTFS in delay-Doppler channels"):

$$\hat{h}_{\bar{m}\bar{n}} \sum_{\bar{l}=1,\bar{k}=N-Q}^{\bar{l}=W,\bar{k}=2Q} (H*X)_{\bar{l}\bar{k}}e^{j2\pi\left(\frac{\bar{n}\bar{k}}{N}-\frac{\bar{m}\bar{l}}{M}\right)} + I_{\bar{m}\bar{n}} \quad (20)$$

for all $(\bar{m}, \bar{n})\in I$. FIG. 1 highlights the symbols used for channel estimation in a black dashed frames (i.e. the pilot symbol 110 and a subset of the guard symbols 120).

At least some embodiments include Time-Frequency Equalization. In some concepts, computational feasible equalizers may suffer from mismatched time-frequency grids. Parity may be achieved with perfect gird matching and pulse-shaping of the Gabor synthesis and analysis pulses with the delay and Doppler spread of the channel. By introducing grid matching, the equalization performance may be improved and hence a higher OTFS diversity may be achieved. However, evaluations have shown that the cross terms may be compensated further, not only by grid matching, in order to improve the performance.

For channel equalization, linear equalizers may be favored due to their lower complexity compared to maximum likelihood estimation (MLE) equalizers. Although MLE enjoy an increased diversity, in some cases also linear equalizer can achieve the same diversity gain as MLE, for example in the case of non-singular convolutions. However, in T. Zemen et al: "Low-complexity equalization for orthogonal time and frequency signaling (OTFS)" it has been observed that in general, full OTFS diversity is not obtained when using common minimum mean square error (MMSE) equalization in the TF domain and then MLE decoding is required. On the other hand, MLE or interference cancellation techniques for OTFS may be complex and require also accurate estimation of the crosstalk channel coefficients.

In order to obtain sufficient performance at moderate complexity for a practical implementation, at least some embodiments may use mobility modes which control the self-interference on a coarse level, and use the MMSE equalization to account for the remaining self-interference power. In detail, the received frame (17) may be equalized by a MMSE equalization in TF domain with estimated channel obtained in (20):

$$\hat{x}_{\overline{mn}} = y_{\overline{mn}} \frac{\hat{h}^*_{\overline{mn}}}{|\hat{h}_{\overline{mn}}|^2 + \sigma^2 + \mathbb{E}_x\{|I_{\overline{mn}}|^2 + |h_{\overline{mn}} - \hat{h}_{\overline{mn}}|^2\}} \quad (21)$$

where $\sigma^2$ is the squared standard deviation of the noise at the receiver. For example, I may be defined by $I=\Sigma_{\overline{mn}\neq mn}|h_{mn}|^2$.

To estimate the expectation above, the empirical mean for the power of the self-interference and estimation error in a calibration phase may be determined. This deterministic value may be used for the numerical results of FIGS. 3a, 3b, and 4a to 4d. Finally, the equalized frame may be received with (5) in the DD domain.

$$\hat{X}_{\overline{lk}} = \sum_{(\overline{m},\overline{n})\in I} \hat{x}_{\overline{mn}} e^{-j2\pi\left(\frac{\overline{n}k}{N} - \frac{\overline{m}l}{M}\right)} \quad (22)$$

In order to obtain the same diversity gain as MLE, at least some embodiments may extend the common MMSE equalizer by a term to compensate the self-interference caused by the channel cross terms. Therefore, the cross-term interference (i.e. the self-interference) may be determined at the receiver (i.e. by the processing module) using the received pilot, and the compensation term may be determined in the delay-Doppler domain based on the knowledge of the pilot(s) and guard symbols. In other words, the processing module 24 may be configured to perform equalization on received data frames. Accordingly, the method may comprise performing 260 equalization on received data frames. The equalization may be performed using a minimum mean square equalizer (see e.g. equation 21). The minimum mean square equalizer may comprise a term to compensate for self-interference (e.g. $|I_{\overline{mn}}|^2$ or $I_{\overline{mn}}$ of equation 21). At the receiver it an a priori knowledge of the pilot set $X_{\overline{lk}}$ and the squared standard deviation of the receiver noise may be used to calculate the term to compensate for the self-interference. The term to compensate for the self-interference may be calculated by L2-norm minimization of the error (or of another norm). For example, the term to compensate for the self-interference (e.g. for use in equation 21) may be calculated using:

$$I_{l2} = \arg_I \min \sum_{(\overline{k},\overline{l})\in P} |\hat{X}_{\overline{lk}}(I) - X_{\overline{lk}}|^2$$

where I for the lowest term is obtained using L2-norm minimization. In other words, the above equation may be calculated over a range of values for I (and the corresponding equalized received signal in delay-Doppler representation, $\hat{Y}_{\overline{lk}}$) in order to obtain the value for which the self-interference is suppressed. For example, equation 21 may be used to calculate the values of $\hat{Y}_{\overline{lk}}(I)$. Furthermore, this compensation factor may be estimated (by choosing adequate values of I, for which the minimization is performed, and it may be predicted for the future in order to accelerate and simply the process.

In other words, the processing module 24 may be configured to determine the term to compensate for self-interference using a previously received data frame. Accordingly, the method may comprise determining 262 the term to compensate for self-interference using a previously received data frame. For example, as pointed out above, a range of different values for the term to compensate for self-interference may be tried on the previously received data frame, and the term to compensate for self-interference may be chosen based on the value that has performed best (e.g. as indicated by the result of the equalization). This may be done based on the guard symbols and pilot in the delay-Doppler plane. For example, the term to compensate for self-interference may be determined using a subset of the plurality of guard symbols, and optionally the pilot symbol, of the previously received data frame. In other words, the processing module 24 may be configured to determine the term to compensate self-interference by performing the equalization using a plurality of values for the term to compensate for self-interference, evaluating a quality of a result of the equalization performed using the plurality of values (e.g. a deviation of the sum of the values obtained for the guard symbols from zero), and selecting a value of the plurality of values for the term to compensate for self-interference based on the evaluation (e.g. by picking the term to compensate for self-interference that yields the lowest sum of the values obtained for the guard symbols). For example, as shown previously, the SFFT might be performed (only) for the guard and pilot symbols in the delay-Doppler plane. If the guard symbols are assumed to yield zero (if the self-interference is corrected for), the deviation from zero may be used as minimization criterion. Accordingly, the term to compensate self-interference may be determined 262 by performing 260 the equalization using a plurality of values for the term to compensate for self-interference, evaluating 264 a quality of a result of the equalization performed using the plurality of values, and selecting 266 a value of the plurality of values for the term to compensate for self-interference based on the evaluation.

In more detail, the two-dimensional time-frequency grid may be derived from a two-dimensional grid in a delay-Doppler plane having a delay dimension and a Doppler dimension. The processing module 24 may be configured to perform a symplectic Fourier transform on the received data frame (e.g. based on the equalized data frame that was equalized using a value of a range of values for the term to compensate for the self-interference). Accordingly, the method may comprise performing 234 a symplectic Fourier transform on the received data frame. The symplectic Fourier transform may be performed (only) for the points on the two-dimensional grid in the delay-Doppler plane corresponding to the subset of the plurality of guard symbols (and optionally for the point on the two-dimensional grid in the delay-Doppler plane corresponding to the pilot symbol). The processing module may be configured to determine the term to compensate for self-interference based on a result of the symplectic Fourier transform. Accordingly, the method may comprise determining 262 the term to compensate for self-interference based on a result of the symplectic Fourier transform. For example, the result of the SFFT may be used for the evaluation of the quality of the result of the equalization. In other words, the result of the SFFT may show the quality of the term to compensate for the self-interference.

The calculation of this compensation factor (i.e. of the term to compensate for self-interference) does not necessarily be calculated for every frame. It might be enough to update it after several frames. In other words, the processing module 24 may be configured to periodically update the term to compensate for the self-interference. Accordingly, the method may comprise periodically updating 268 the term to compensate for the self-interference. For example, the term to compensate for the self-interference might be updated at most every second (or every third, every fourth, every nth) data frame. Alternatively, the term to compensate for the self-interference might be updated if the quality of the equalization deteriorates (too much). For example, the processing module 24 may be configured to update the term to compensate for the self-interference if a bit-error rate of a received data frame exceeds a threshold. Accordingly, the method may comprise updating 268 the term to compensate for the self-interference if a bit-error rate of a received data frame exceeds a threshold.

Furthermore, the compensation term might be sent back to the transmitter. For example, the processing module 24 may be configured to transmit information about the term to compensate for self-interference to the further wireless communication device. Accordingly, the method may comprise transmitting 269 information about the term to compensate for self-interference to the further wireless communication device. For example, the information about the term to compensate for self-interference may comprise a numerical value of the term to compensate for self-interference, or one or more component values that can be used to calculate the term to compensate for self-interference at the further wireless communication device.

The transceiver module 22 may be implemented as any means for transceiving, i.e. receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. In some embodiments, the processing module 24 may provide some functionality that may be found in transceiver modules. For example, the processing module 24 may be a processing module of the transceiver module 22, and may comprise one or more filters or filter circuitry and/or one or more modulators or demodulators.

In embodiments the processing module 24 may be implemented using one or more processing units, one or more processing devices, any means for processing, such as a processor, a computer or a programmable hardware component being operable with accordingly adapted software. In other words, the described function of the processing module 24 may as well be implemented in software, which is then executed on one or more programmable hardware components. Such hardware components may comprise a general purpose processor, a Digital Signal Processor (DSP), a micro-controller, etc.

In the following, an evaluation of the mobility modes is shown with numerical results of different configurations. The approach of using distinct mobility modes for grid and pulse matching may be shown. The goal of these mobility modes may be to approach a good approximation (small deviation from equality) in (15) and hence to reduce the self-interference. This may be fulfilled when all system parameters such as the grid and pulses match the delay and Doppler spread of the channel as stated in (1). In order to cope with different channel conditions, i.e. distinct delay and Doppler spreads, five mobility modes are investigated. The mobility modes may be chosen according to a scheme, in which the higher the resolution in time (N symbols) the less resolution in frequency domain (M subcarrier) may be available and vice versa. Mode I of FIG. 3a (64 points in all dimensions) represents the case for equal time and frequency resolution. It may be referred to a G-Mode or R-Mode, when at the Gabor filter bank a Gaussian or rectangular pulse is used, respectively.

FIGS. 3a and 3b show these mobility modes and indicate at which SNR (Signal-to-Noise-Ratio) level a certain BER (Bit Error Ratio) threshold is exceeded. FIG. 3a shows a required SNR to exceed the threshold of BER=$10^{-2}$ for mobility modes I-V, FIG. 3b shows a required SNR to exceed the threshold of BER=$10^{-3}$ for mobility modes I-V. These thresholds can be used to trigger channel coding. For the evaluation of BER curves, two thresholds may be considered. First, in FIG. 3a, the SNR needed to exceed a BER threshold of $10^{-2}$ bits is shown. Second, in FIG. 3b, the required SNR for a lower BER threshold of $10^{-3}$ bits is explored. FIGS. 3a and 3b therefore depict the first and second BER threshold, respectively. In FIGS. 3a and 3b, the SNR required to exceed the BER threshold is shown for three scenario: vehicle-to-infrastructure (V2I) at 10 km/h (reference sign 310), V2I at 190 km/h (reference sign 320) and vehicle-to-vehicle (V2V) at 200 km/h (reference sign 330). The values are shown for five modes (I-V) and rectangular and Gaussian pulses. Mobility mode I has an N of 64 and an M of 64 (N being the number of symbols, i.e. the number of points in the time dimension of the time-frequency plane, M being the number of sub-carriers, i.e. the number of points in the frequency dimension of the time-frequency plane). Mobility mode II has an N of 256 and an M of 16. Mobility mode III has an N of 16 and an M of 256. Mobility mode IV has an N of 1024 and an M of 4. Mobility mode V has an N of 4 and an M of 1024. As shown in FIG. 3a, to achieve a BET of $10^{-2}$, the best results for V2I at 10 km/h (310) was found with mobility mode III and a Gaussian pulse (10.6 dB), the best result for V2I at 190 km/h (320) was found with mobility mode I and a Gaussian pulse (8.8 dB), and the best result for V2V at 200 km/h (330) was found with either mobility mode I or II and a Gaussian pulse (7.7 dB). As shown in FIG. 3b, to achieve a BET of $10^{-3}$, the best results for V2I at 10 km/h (310) was found with mobility mode V and a Gaussian pulse (18.1 dB), and the best result for V2V at 200 km/h (330) was found with mobility mode II and a Gaussian pulse (12.9 dB). FIG. 3c summarizes the parameters used to obtain the numerical results.

Figure 4A:
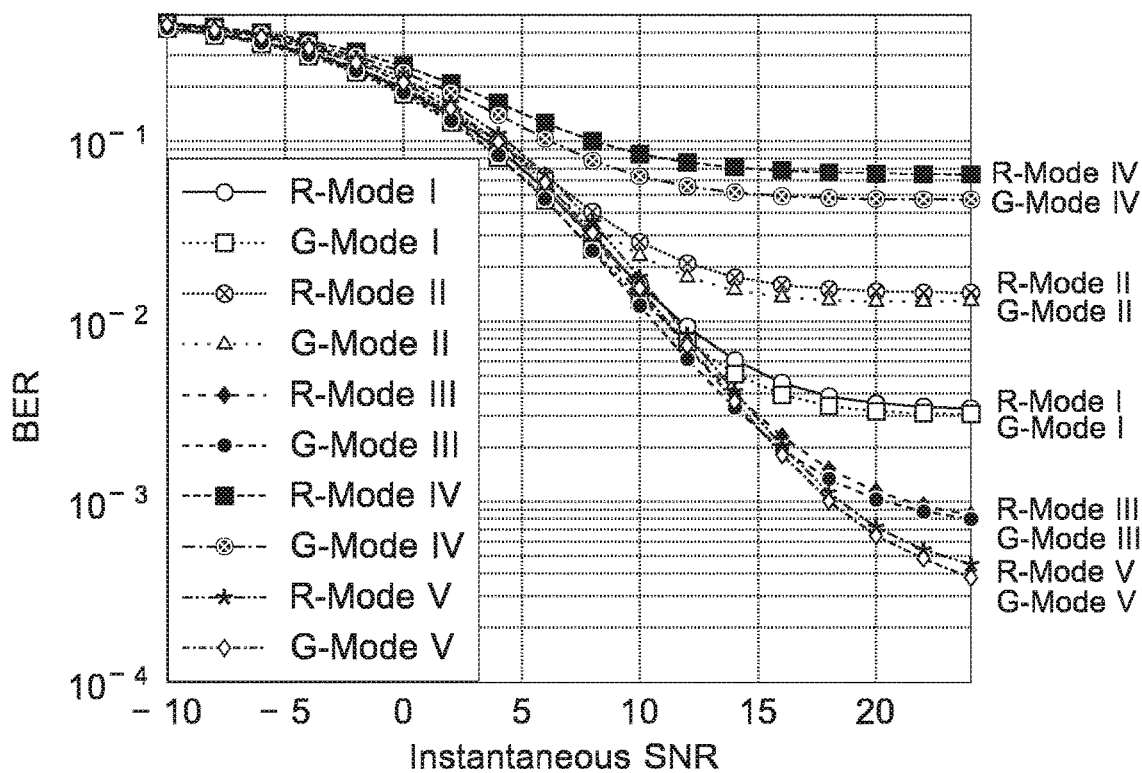

FIGS. 4a to 4d show BER curves for three distinct vehicular channels for different mobility modes. The mobility modes I to V (of FIGS. 3a and 3b) are referenced by reference signs G-Mode I (mobility mode I, Gaussian pulse), R-Mode I (mobility mode I, rectangular pulse), G-Mode II (mobility mode II, Gaussian pulse) etc. FIG. 4a depicts a vehicle-to-infrastructure (V2I) channel for lower velocities (10 km/h, reference sign 310). Mode IV and II are not exceeding any BER threshold. Mode III reaches the first BER threshold before the remaining modes. For the lower threshold Mode V outperforms the other modes and also reaches the lowest error floor.

Figure 4B:
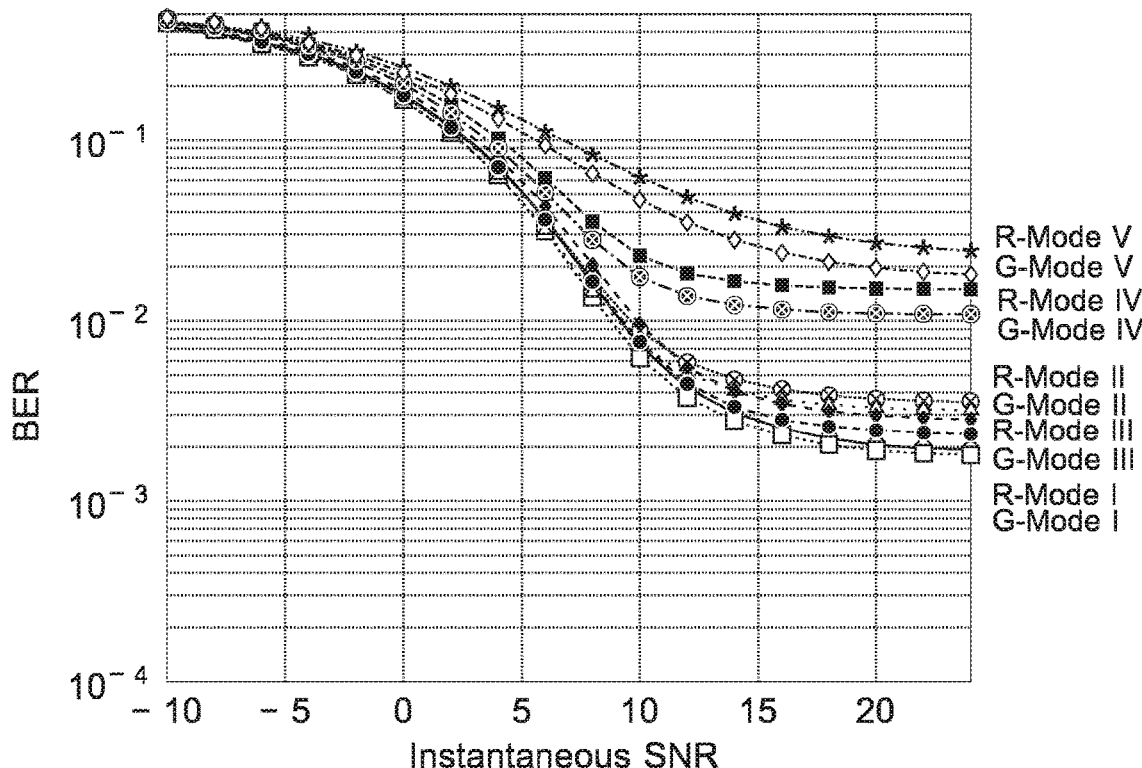

In FIG. 4b, a V2I channel for higher velocities is plotted, where Mode IV and V are not exceeding any BER threshold. Note that Mode V performs good for low but not for the high velocity V2I channel (190 km/h, reference sign 320). The best performance is achieved with Mode I, where BER threshold is reached for a SNR of 8.8 dB (see FIG. 3a). The second BER threshold is not reached by any mode, as depicted in FIG. 3b.

Figure 4C:
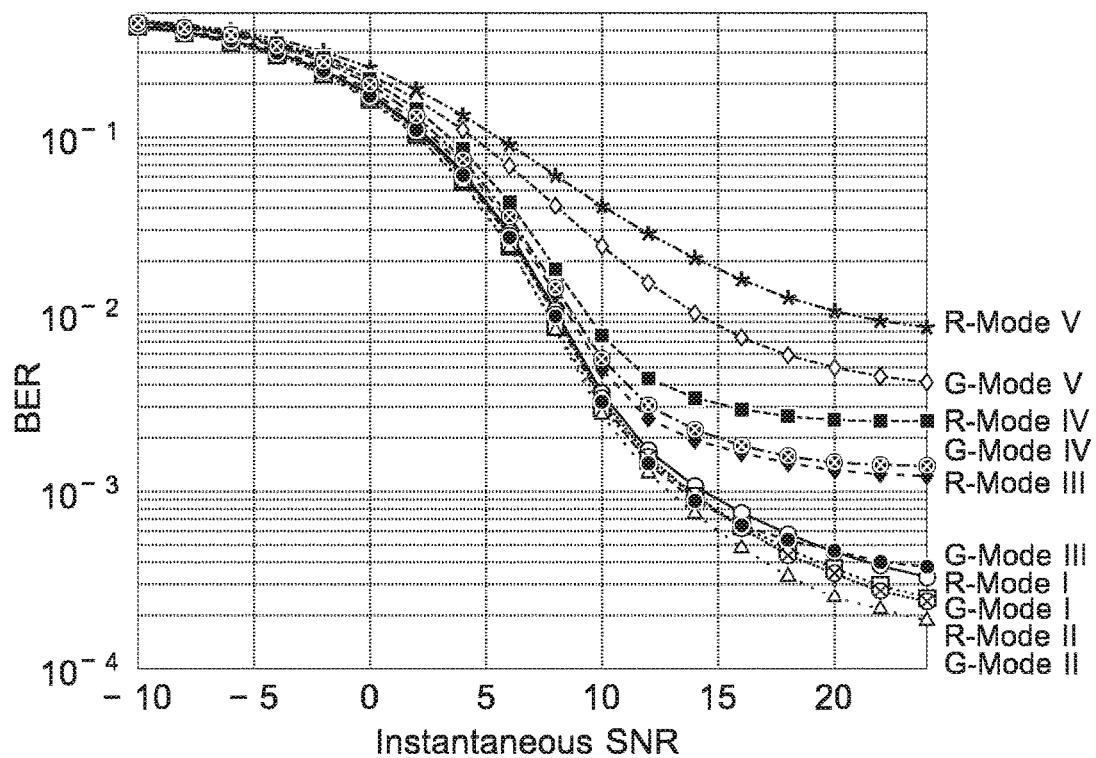

The V2V channel is evaluated as third communication link. FIG. 4c depicts a high speed V2V channel with a relative velocity of 200 km/h (reference sign 330). Here both Mode I and II outperform the other mobility modes and exceed the first BER threshold for a SNR of 7.7 dB (see FIG. 3a). The second BER threshold is reached first by Mode II, which is offering the lowest error floor.

Figure 4D:
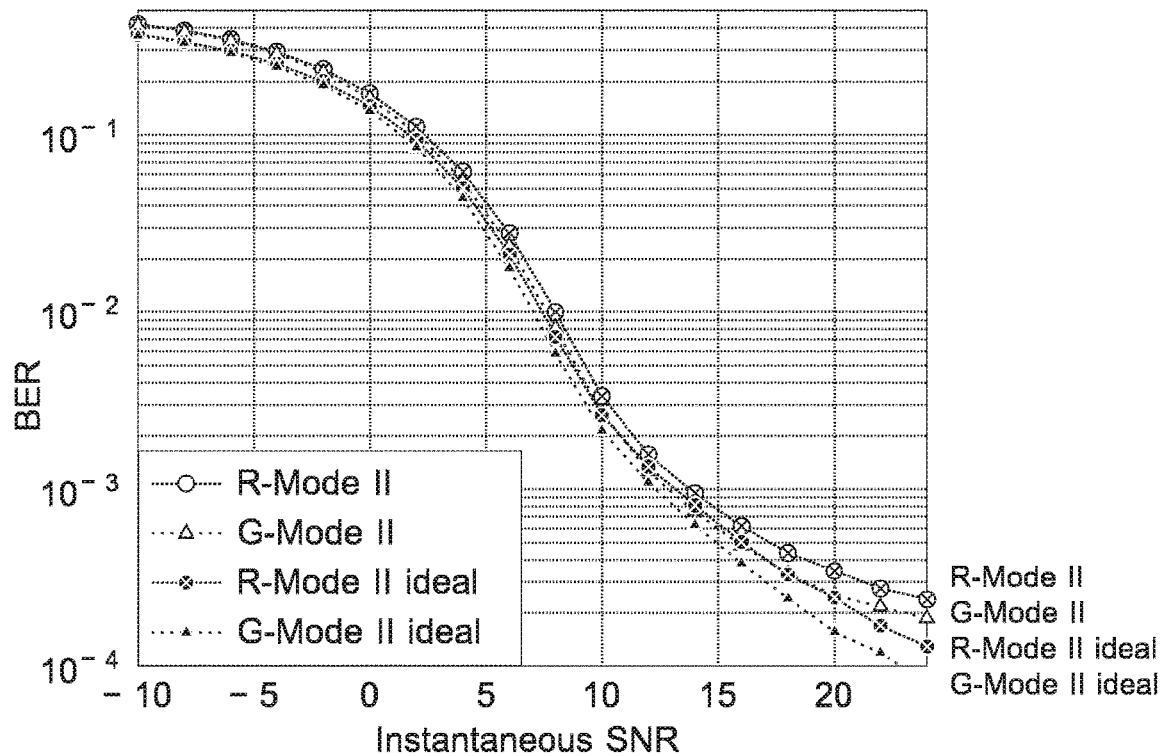

In FIG. 4d, Mode II is depicted in comparison to an ideal channel estimation (V2V, relative velocity of 200 km/h, reference sign 330). It can be observed, that even if the best mobility mode is selected, there is still self-interference and an estimation error which might be compensated with a more advanced channel estimation and equalization.

OTFS modulation was introduced from the classical viewpoint of a pulse shaped multicarrier scheme, also called Weyl Heisenberg or Gabor signaling, with additional spreading using the symplectic Fourier transform. Selecting an appropriate mobility mode for pulse and grid matching the self-interference level, immanent in doubly-dispersive channels, may reduce and hence also the operation point to support a target BER threshold required for certain types of channel coding. It may be concluded that through the introduction of mobility modes, the system performance for low-complexity equalizers implementing tuned 2D-deconvolutions may be improved instead of dealing with the full twisted convolution. For each vehicular channel a distinct mobility mode may outperform the other modes and the effect may improve with more accurate channel knowledge. Tuning the equalizer for instantaneous interference levels may provide further gains of mobility modes.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for a wireless communication device, the apparatus comprising:
a transceiver for transmitting and receiving wireless transmissions; and
a processor configured to:
control the transceiver;
communicate with a further wireless communication device via transceiver;
wherein the communication with the further wireless communication device is based on a transmission of data frames between the wireless communication device and the further wireless communication device,
wherein each data frame is based on a two-dimensional grid in a time-frequency plane having a time dimension resolution and a frequency dimension resolution,
select a communication mode from a plurality of communication modes for the communication between the wireless communication device and the further wireless communication device, wherein the communication mode defines a combination of a frequency dimension resolution and a time dimension resolution of the two-dimensional grid in the time-frequency plane,
negotiate a communication mode of the plurality of communication modes to select for a future communication between the wireless communication device and the further wireless communication device with the further wireless communication device,
receive information about a communication mode to select for a future communication between the wireless communication device and the further wireless communication device from the further wireless communication device, and
examine the information about the communication mode to select for the future communication based on an examination criterion, and
select the communication mode for the future communication with the further wireless communication device if the examination criterion is fulfilled, transmit a response to the further wireless communication device if the examination criterion is not fulfilled, the response comprising information about an alternative communication mode to select for the future communication, and wherein
each data frame comprises a pilot symbol, wherein the processor is configured to determine a spreading function of a channel that is used liar the communication based on the pilot symbol of a previously received data frame, wherein the examination criterion is based on the spreading function of the channel and wherein the spreading function denotes a delay spread and a doppler spread of the channel.

2. The apparatus according to claim 1, wherein the processor-is configured to initially select a communication mode that is known at the wireless communication device and at the further wireless communication device for the communication between the wireless communication device and the further wireless communication device.

3. The apparatus according to claim 2, wherein the processor-is configured to initially select a default communication mode for the communication between the wireless communication device and the further wireless communication device.

4. The apparatus according to claim 2, wherein the processor-is configured to initially select a communication mode that was selected for a previous communication between the wireless communication device and the further wireless communication device for the communication between the wireless communication device and the further wireless communication device.

5. The apparatus according to claim 1, wherein the processor-is configured to transmit information about a communication mode to select for a future communication between the wireless communication device and the further wireless communication device to the further wireless communication device, and to select the communication mode for the future communication with the further wireless communication device.

6. The apparatus according to claim 5, wherein each data frame comprises a pilot symbol, wherein the processor-is configured to determine a spreading function of a channel that is used for the communication based on the pilot symbol of a previously received data frame, and to select the communication mode for the future communication based on the spreading function of the channel.

7. The apparatus according to claim 1, wherein each data frame comprises a pilot symbol, wherein the processor is configured to determine a spreading function of a channel that is used for the communication based on the pilot symbol of a previously received data frame, and to select the alternative communication mode for the future communication based on the spreading function of the channel.

8. The apparatus according to claim 1, wherein the communication between the wireless communication device and the further wireless communication device comprises a plurality of data frames that are transmitted between the wireless communication device and the further wireless communication device, wherein the processor-is configured to change the communication mode during the communication between the wireless communication device and the further wireless communication device.

9. The apparatus according to claim 1, wherein the two-dimensional time-frequency grid is derived from a two-dimensional grid in a delay-Doppler plane having a delay dimension and a Doppler dimension,
and/or wherein the data frame is an Orthogonal Time-Frequency Space (OTFS) data frame.

10. A wireless communication device comprising the apparatus according to claim 1.

11. A method for a wireless communication device, the method comprising:
communicating with a further wireless communication device,
wherein the communication with the further wireless communication device is based on a transmission of data frames between the wireless communication device and the further wireless communication device,
wherein each data frame is based on a two-dimensional grid in a time-frequency plane having a time dimension resolution and a frequency dimension resolution;
selecting a communication mode from a plurality of communication modes for the communication between the wireless communication device and the further wireless communication device, wherein the communication mode defines a combination of a frequency dimension resolution and a time dimension resolution of the two-dimensional grid in the time-frequency plane; and negotiating a communication mode of the plurality of communication modes to select for a future communication between the wireless communication device and the further wireless communication device with the further wireless communication device, receiving information about a communication mode to select for a future communication between the wireless communication device and the further wireless communication device from the further wireless communication device, examining the information about the communication mode to select for the future communication based on an examination criterion, and selecting the communication mode for the future communication with the further wireless communication device if the examination criterion is fulfilled, transmitting a response to the further wireless communication device if the examination criterion is not fulfilled, the response comprising information about an alternative communication mode to select for the future communication, and wherein each data frame comprises a pilot symbol, wherein the processor is configured to determine a spreading function of a channel that is used for the communication based on the pilot symbol of a previously received data frame, wherein the examination criterion is based on the spreading function of the channel and wherein the spreading function denotes a delay spread and a doppler spread of the channel.

12. A non-transitory, computer-readable medium comprising a program code for performing a method for a wireless communication device when the-program code is executed on a computer, a processor, or a programmable hardware component, the method comprising:

communicating with a further wireless communication device, wherein the communication with the further wireless communication device is based on a transmission of data frames between the wireless communication device and the further wireless communication device, wherein each data frame is based on a two-dimensional grid in a time-frequency plane having a time dimension resolution and a frequency dimension resolution;

selecting a communication mode from a plurality of communication modes for the communication between the wireless communication device and the further wireless communication device, wherein the communication mode defines a combination of a frequency dimension resolution and a time dimension resolution of the two-dimensional grid in the time-frequency plane; and negotiating a communication mode of the plurality of communication modes to select for a future communication between the wireless communication device and the further wireless communication device with the further wireless communication device, receiving information about a communication mode to select for a future communication between the wireless communication device and the further wireless communication device from the further wireless communication device, examining the information about the communication mode to select for the future communication based on an examination criterion, and selecting the communication mode for the future communication with the further wireless communication device if the examination criterion is fulfilled, transmitting a response to the further wireless communication device if the examination criterion is not fulfilled, the response comprising information about an alternative communication mode to select for the future communication, and wherein each data frame comprises a pilot symbol, wherein the processor is configured to determine a spreading function of a channel that is used for the communication based on the pilot symbol of a previously received data frame, wherein the examination criterion is based on the spreading function of the channel and wherein the spreading function denotes a delay spread and a doppler spread of the channel.

\* \* \* \* \*

UNITED STATES PATENT AND TRADEMARK OFFICE
CERTIFICATE OF CORRECTION

PATENT NO. : 11,438,110 B2
APPLICATION NO. : 17/069935
DATED : September 6, 2022
INVENTOR(S) : Pfadler et al.

Page 1 of 1

It is certified that error appears in the above-identified patent and that said Letters Patent is hereby corrected as shown below:

On the Title Page

Item (12), delete "Pfadler" and insert --Pfadler et al.--.

Item (72), the list of inventor "Andreas Pfadler, Berlin (DE)" should read --Andreas Pfadler, Berlin (DE), Peter Jung, Berlin (DE), Slawomir Stanczak, Berlin (DE)--.

Signed and Sealed this
Twenty-eighth Day of March, 2023

Katherine Kelly Vidal
*Director of the United States Patent and Trademark Office*